(12) United States Patent
Nguyen et al.

(10) Patent No.: US 10,846,492 B2
(45) Date of Patent: *Nov. 24, 2020

(54) TAG BASED LOCATION

(71) Applicant: Rockwell Automation Technologies, Inc., Mayfield Heights, OH (US)

(72) Inventors: Thong T. Nguyen, New Berlin, WI (US); Kevin E. Colloton, Waukesha, WI (US); Alex L. Nicoll, Brookfield, WI (US); Paul D. Schmirler, Glendale, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/508,145

(22) Filed: Jul. 10, 2019

(65) Prior Publication Data

US 2019/0332831 A1 Oct. 31, 2019

Related U.S. Application Data

(63) Continuation of application No. 16/010,130, filed on Jun. 15, 2018, now Pat. No. 10,395,072, which is a
(Continued)

(51) Int. Cl.
| | | |
|---|---|---|
| *G06K 7/00* | (2006.01) |
| *G06K 7/10* | (2006.01) |
| *G06Q 10/08* | (2012.01) |
| *G06Q 50/28* | (2012.01) |
| *G06Q 50/00* | (2012.01) |
| *G06K 7/14* | (2006.01) |

(52) U.S. Cl.
CPC ....... *G06K 7/10297* (2013.01); *G06K 7/1413* (2013.01); *G06K 7/1417* (2013.01); *G06Q 10/08* (2013.01); *G06Q 10/0833* (2013.01); *G06Q 50/00* (2013.01); *G06Q 50/28* (2013.01)

(58) Field of Classification Search
USPC ................. 235/435, 439, 454, 462
See application file for complete search history.

(56) References Cited

U.S. PATENT DOCUMENTS

| | | | |
|---|---|---|---|
| 10,023,053 B2 | 7/2018 | Park | |
| 10,032,053 B2 * | 7/2018 | Nguyen | ................. G06Q 50/00 |
| (Continued) | | | |

FOREIGN PATENT DOCUMENTS

| | | |
|---|---|---|
| CN | 1768299 A | 5/2006 |
| CN | 102750006 A | 10/2012 |
| (Continued) | | |

OTHER PUBLICATIONS

European Patent Office, "Extended European Search Report", dated Apr. 12, 2018, pp. 1-7.
(Continued)

*Primary Examiner* — Matthew Mikels
(74) *Attorney, Agent, or Firm* — Kunzler Bean & Adamson

(57) ABSTRACT

For determining a tag based location, a display presents the image. A processor identifies a given equipment tag within the image at a user focus determined at the augmented reality display. The processor further determines a device location based on the given equipment tag.

20 Claims, 23 Drawing Sheets

Related U.S. Application Data continuation of application No. 15/719,246, filed on Sep. 28, 2017, now Pat. No. 10,032,053.

(60) Provisional application No. 62/418,514, filed on Nov. 7, 2016.

(56) References Cited

U.S. PATENT DOCUMENTS

| | | | |
|---|---|---|---|
| 10,395,072 B2* | 8/2019 | Nguyen | G06Q 50/28 |
| 2011/0173127 A1 | 7/2011 | Ho et al. | |
| 2012/0195506 A1 | 8/2012 | Kim et al. | |
| 2013/0083064 A1 | 4/2013 | Geisner et al. | |
| 2014/0027503 A1 | 6/2014 | Kennedy et al. | |
| 2014/0263674 A1* | 9/2014 | Cerveny | G06K 19/06028 235/494 |
| 2016/0188943 A1* | 6/2016 | Franz | G06K 7/10841 705/21 |
| 2016/0239085 A1 | 8/2016 | Qian et al. | |

FOREIGN PATENT DOCUMENTS

| | | |
|---|---|---|
| CN | 102780772 A | 11/2012 |
| CN | 104520799 A | 4/2015 |
| CN | 104903818 A | 9/2015 |
| CN | 205427892 U | 8/2016 |
| EP | 2410490 A2 | 1/2012 |
| WO | 2015/163833 A1 | 10/2015 |

OTHER PUBLICATIONS

European Patent Office, "Extended European Search Report", dated Jan. 14, 2020, pp. 1-7.

China National Patent Office, "Notification of the First Office Action", Jul. 3, 2020, pp. 1-8.

* cited by examiner

270

| Menu 271a | Equipment Privilege 230a | Menu Log 273a |
|---|---|---|
| Menu 271b | Equipment Privilege 230b | Menu Log 273b |
| Menu 271c | Equipment Privilege 230c | Menu Log 273c |

| Data Set 277a | Equipment Privilege 230a | Data Set Log 279a |
|---|---|---|
| Data Set 277b | Equipment Privilege 230b | Data Set Log 279b |
| Data Set 277c | Equipment Privilege 230c | Data Set Log 279c |

| | Function 281a | Equipment Privilege 230a | Function Log 283a |
|---|---|---|---|
| 282a | | | |
| 282b | Function 281b | Equipment Privilege 230b | Function Log 283b |
| 282c | Function 281c | Equipment Privilege 230c | Function Log 283c |

FIG. 2H

TAG BASED LOCATION

This application is a continuation of and claims priority to U.S. patent application Ser. No. 16/010,130 entitled "TAG BASED LOCATION" and filed on Jun. 15, 2018 for Thong T. Nguyen, which is incorporated herein by reference, which is a continuation of and claims priority to U.S. patent application Ser. No. 15/719,246 entitled "TAG BASED LOCATION" and filed Sep. 28, 2017 for Thong T. Nguyen, which is incorporated herein by reference, and which claims priority to U.S. Provisional Patent Application 62/418,514 entitled "PRESENTING EQUIPMENT CONTROLS" and filed on Nov. 7, 2016 for Thong T. Nguyen, which is incorporated herein by reference.

BACKGROUND INFORMATION

The subject matter disclosed herein relates to determining a location based on a tag.

BRIEF DESCRIPTION

An electronic device for tag based location is disclosed. The electronic device includes a display, a processor, and a memory. The display presents an image. The memory stores credential data and code executable by the processor. The processor identifies a given equipment tag within the image at a user focus determined at the augmented reality display. The processor further determines a device location based on the given equipment tag. A method and computer program product also perform the functions of the electronic device.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 2F is a schematic block diagram of an available menu list according to an embodiment;

FIG. 2G is a schematic block diagram of an available data set list according to an embodiment;

FIG. 2H is a schematic block diagram of an available functions list according to an embodiment;

DETAILED DESCRIPTION

Figure 1A:
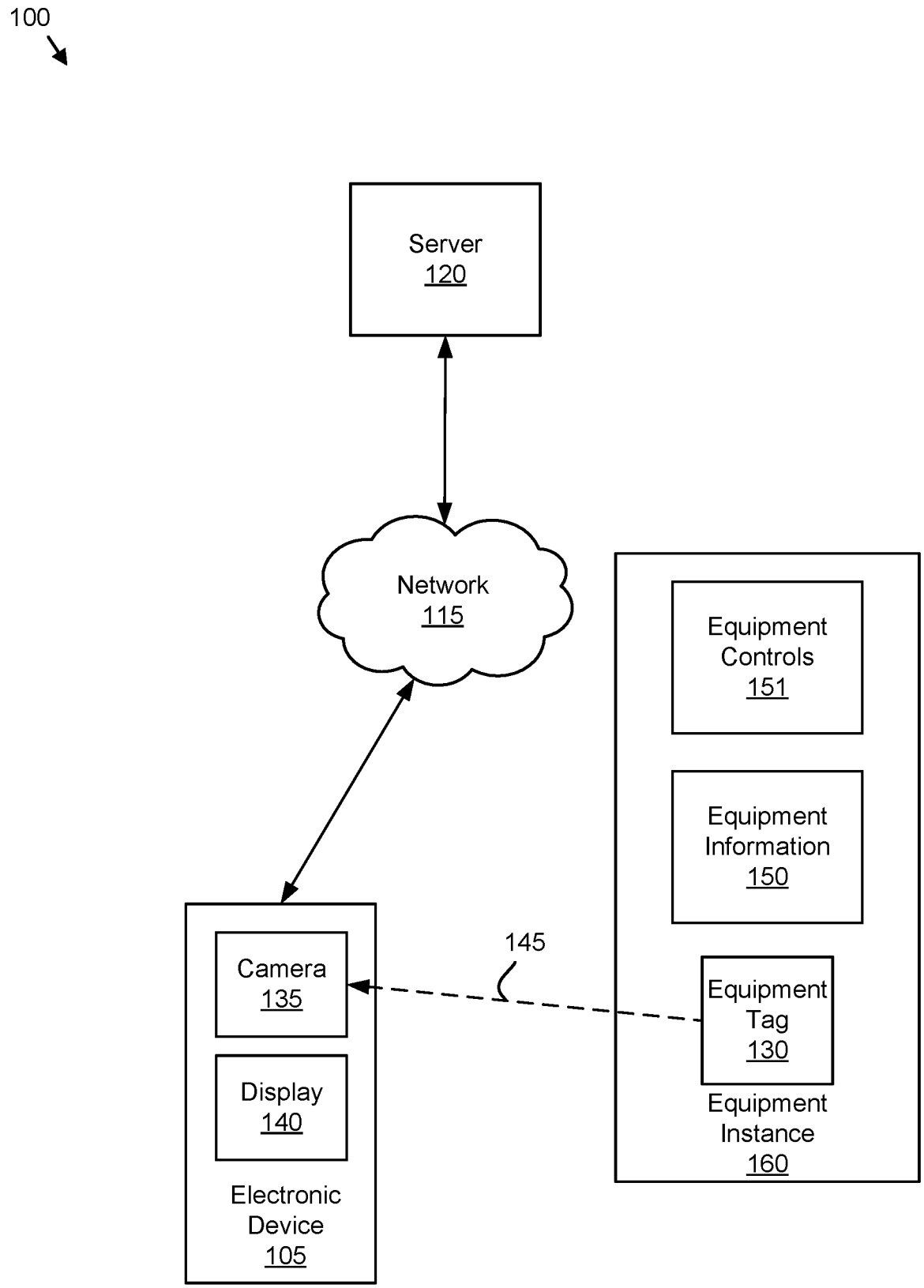
FIG. 1A is a schematic block diagram of equipment information system according to an embodiment.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the program code may be stored and/or propagated on in one or more computer readable medium(s).

The computer readable medium may be a tangible computer readable storage medium storing the program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable storage medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store program code for use by and/or in connection with an instruction execution system, apparatus, or device.

The computer readable medium may also be a computer readable signal medium. A computer readable signal medium may include a propagated data signal with program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport program code for use by or in connection with an instruction execution system, apparatus, or device. Program code embodied on a computer readable signal medium may be transmitted using any appropriate medium, including but not limited to wire-line, optical fiber, Radio Frequency (RF), or the like, or any suitable combination of the foregoing In one embodiment, the computer readable medium may comprise a combination of one or more computer readable storage mediums and one or more computer readable signal mediums. For example, program code may be both propagated as an electro-magnetic signal through a fiber optic cable for execution by a processor and stored on RAM storage device for execution by the processor.

Program code for carrying out operations for aspects of the present invention may be written in any combination of one or more programming languages, including an object-oriented programming language such as Java, Smalltalk, C++, C#, PHP or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). The computer program product may be shared, simultaneously serving multiple customers in a flexible, automated fashion.

The computer program product may be integrated into a client, server and network environment by providing for the computer program product to coexist with applications, operating systems and network operating systems software and then installing the computer program product on the clients and servers in the environment where the computer program product will function. In one embodiment software is identified on the clients and servers including the network operating system where the computer program product will be deployed that are required by the computer program product or that work in conjunction with the computer program product. This includes the network operating system that is software that enhances a basic operating system by adding networking features.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by program code. The program code may be provided to a processor of a general-purpose computer, special purpose computer, sequencer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The program code may also be loaded onto a computer, other programmable data processing apparatus, or other devices to cause a series of operational steps to be performed on the computer, other programmable apparatus or other devices to produce a computer implemented process such that the program code which executed on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

The description of elements in each figure may refer to elements of proceeding figures. Like numbers refer to like elements in all figures, including alternate embodiments of like elements.

FIG. 1A is a schematic block diagram of equipment information system 100. The equipment information system 100 may locate an electronic device 105 and manage the presentation of equipment information 150 at an equipment instance 160. In the depicted embodiment, the system 100 includes a server 120, a network 115, an electronic device 105, and the equipment instance 160.

The equipment instance 160 may be an industrial controller, a motor drive, and the like. The network 115 may be the Internet, a wide-area network, a local area network, a mobile telephone network, a Wi-Fi network, or combinations thereof. The electronic device 105 may be selected from the group consisting of an augmented-reality display, a computer tablet, a watch, a wearable device, and a mobile telephone. In one embodiment, the augmented-reality display is worn over the eyes of the user and displays both physical objects in the user's field-of-view and virtual objects such as virtual controls. The electronic device 105 may store credential data for a user of the electronic device 105.

The server 120 may store one or more databases that are used by the electronic device 105. The server 120 and the electronic device 105 may communicate through the network 115.

The equipment instance 160 may include equipment controls 151. The equipment controls 151 may control the equipment instance 160. In addition, the equipment controls 151 may present the equipment information 150. In addition, the equipment controls 151 may be modified by the equipment information 150. The equipment controls 151 may include one or more of a touchscreen display, a keyboard, a pointing device, discrete buttons, discrete switches, discrete knobs and the like. The equipment controls 151 may express and/or be modified by the equipment information 150.

The electronic device 105 may include a camera 135 and a display 140. The camera 135 may capture an image 145 of the equipment instance 160 and an equipment tag 130 disposed on the equipment instance 160. The equipment tag 130 may be selected from the group consisting of a two-dimensional optical code, a Quick Response (QR) code, a bar code, a Universal Product Code (UPC), a BLUETOOTH® Low Energy (BLE) Tag, a Radio Frequency Identifier (RFID), a Near Field Communication (NFC) tag, and a Europay, Mastercard, Visa (EMV) tag. In one embodiment, two or more types of equipment tag 130 may be employed concurrently. In one embodiment, the equipment tag 130 in codes and equipment reference code.

The system 100 may be used in a facility such as an industrial environment with the plurality of equipment instances 160. In addition, many of the equipment instances 160 may appear to be similar and/or identical. As a result, it may be difficult for a user to locate herself in the industrial facility by using the equipment instances 160 as landmarks. The embodiments described herein determine a device location of the electronic device 105 based on equipment tag 130, allowing the user of the electronic device 105 to determine her position within the facility.

The equipment controls 151 are available to all users with physical access to the equipment instance 160. Unfortunately, not all potential users may have the necessary credentials to employ all of the equipment information 150 and/or the equipment controls 151. The embodiments described herein determine equipment privileges for the equipment instance 160 as a function of an equipment type and the credential data. The embodiments further present the equipment information 150 and/or equipment controls 151 that are enabled by the equipment privileges to the user. As a result, the user is only given access to the equipment information 150 that are within the scope of his credential data, preventing unauthorized and/or unqualified users from accessing some or all equipment information 150.

Figure 1B:
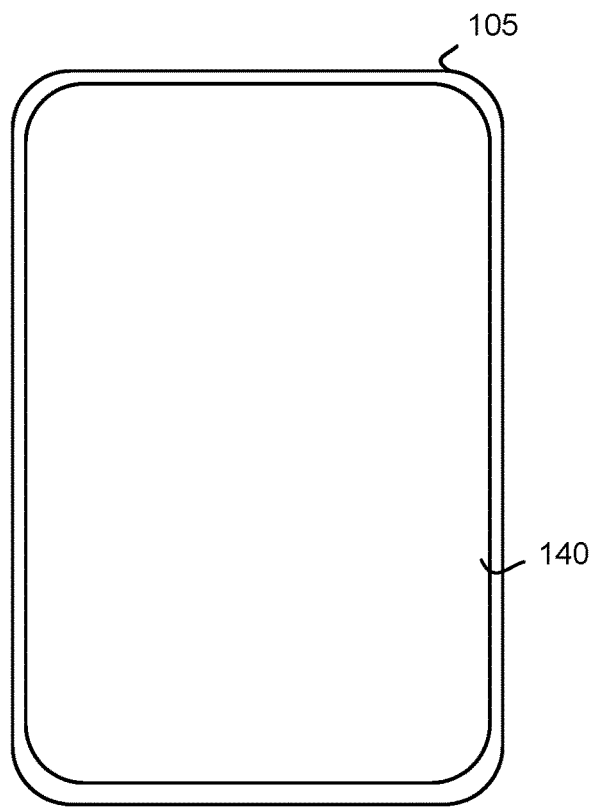
FIG. 1B is a front view drawing of a tablet computer according to an embodiment.

FIG. 1B is a front view drawing of a tablet computer electronic device 105. The tablet computer electronic device 105 includes a display 140 and a camera 135 (not shown). In addition, the tablet computer electronic device 105 includes the computer.

Figure 1C:
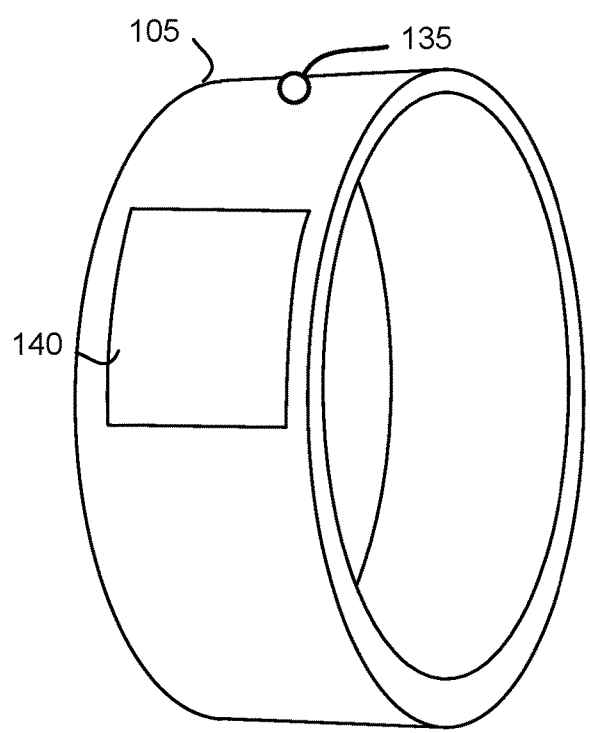
FIG. 1C is a perspective drawing of a wearable device according to an embodiment.

FIG. 1C is a perspective drawing of a wearable device electronic device 105. The wearable device electronic device 105 is shown as a watch and/or bracelet. The wearable device electronic device 105 includes a display 140 and a camera 135. In one embodiment, the wearable device electronic device 105 includes a computer.

Figure 1D:
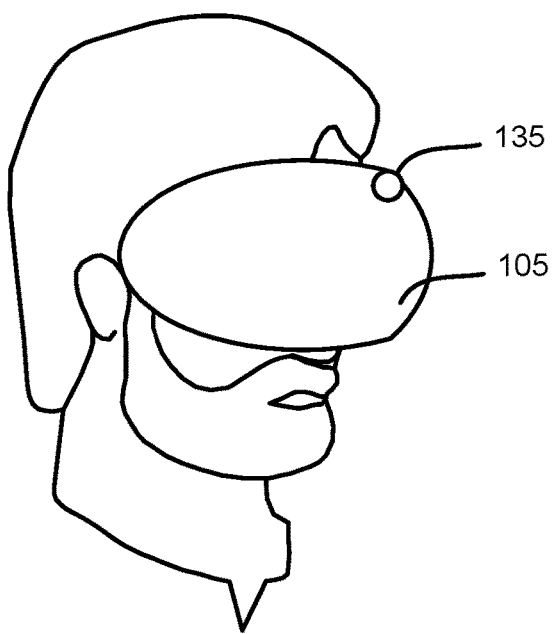
FIG. 1D is a perspective drawing of an augmented reality display according to an embodiment.

FIG. 1D is a perspective drawing of an augmented reality display electronic device 105. In one embodiment, the augmented-reality display is worn over the eyes of the user and displays both physical objects in the user's field-of-view that are captured by a camera 135 and virtual objects such as virtual controls on an internal display (not shown). In one embodiment, the augmented reality display electronic device 105 includes a computer.

Figure 2A:
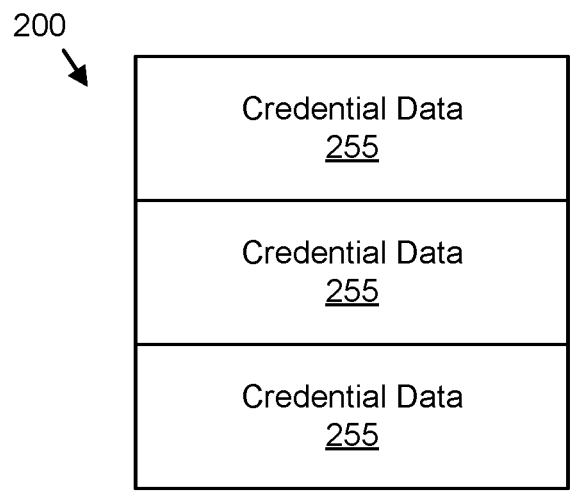
FIG. 2A is a schematic block diagram of a credential database according to an embodiment.

FIG. 2A is a schematic block diagram of a credential database 200. The credential database 200 may be organized as a data structure in a memory such as the memory of the server 120 and/or the electronic device 105. The credential database 200 may include a plurality of credential data 255 that will be described hereafter in FIG. 2D.

Figure 2B:
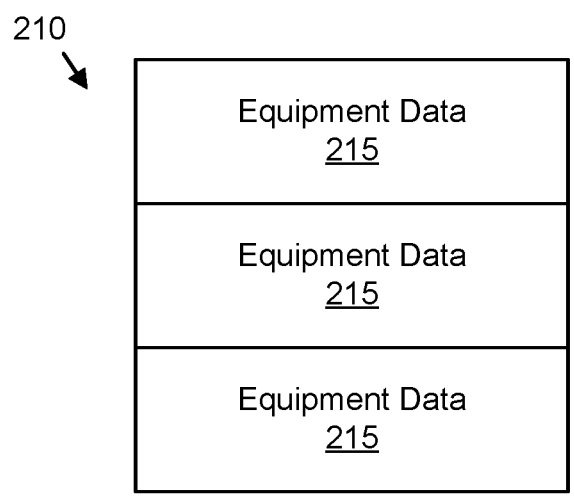
FIG. 2B is a schematic block diagram of an equipment database according to an embodiment.

FIG. 2B is a schematic block diagram of an equipment database 210. The equipment database 210 may be organized as a data structure in a memory such as the memory of the server 120 and/or the electronic device 105. The equipment database 210 may include a plurality of equipment data 215 that will be described hereafter in FIG. 2C.

Figure 2C:
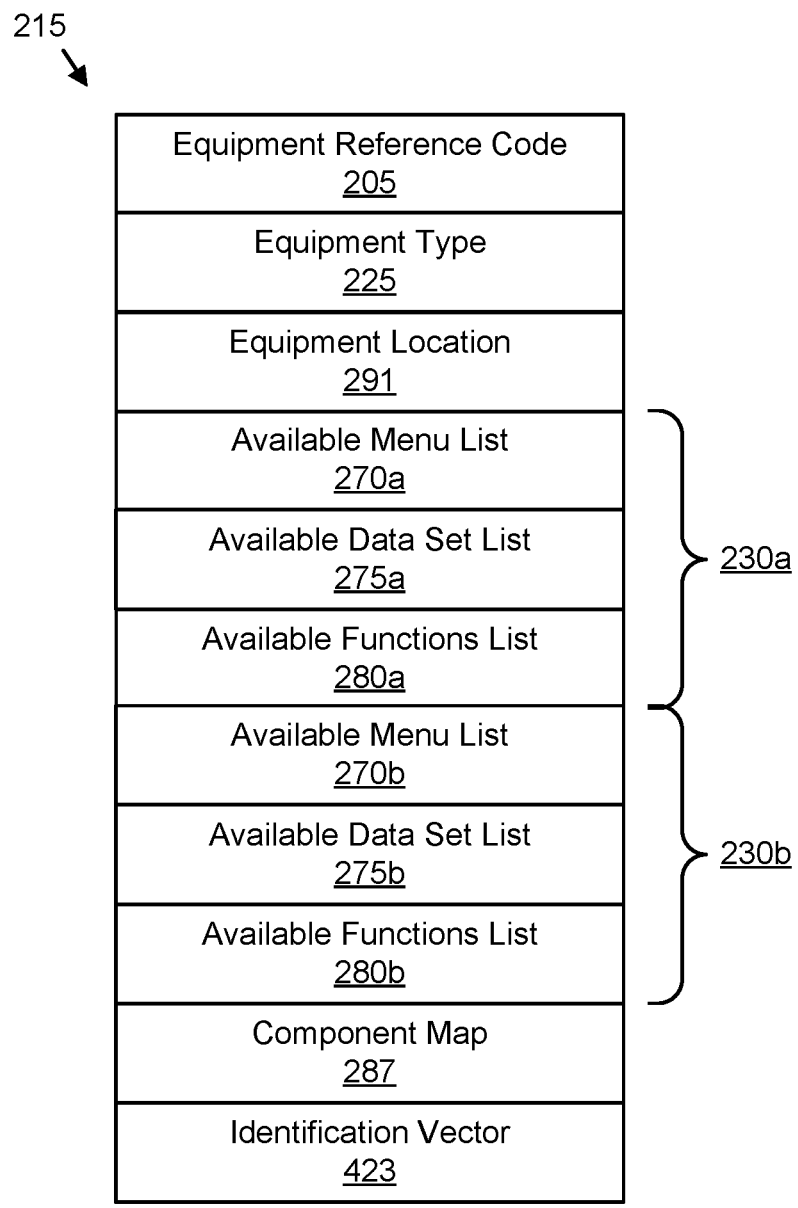
FIG. 2C is a schematic block diagram of equipment data according to an embodiment.

FIG. 2C is a schematic block diagram of the equipment data 215. The equipment data 215 may describe one or more equipment privileges 230 for an equipment instance 160. The equipment data 215 may be organized as a data structure in a memory. In the depicted embodiment, the equipment data 215 includes an equipment reference code 205, an equipment type 225, an equipment location 291, and a plurality of equipment privileges 230. In addition, each equipment privilege 230 may include an available menu list 270, an available data set list 275, and an available functions list 280. In one embodiment, the equipment data 215 includes a component map 287 and an identification vector 423.

The equipment reference code 205 may uniquely identify a single equipment instance 160. In one embodiment, the equipment reference code 205 is a serial number. Alternatively, the equipment reference code 205 may uniquely identify a group of equipment instances 160 and the equipment reference code 205 may include a model number. The equipment reference code 205 may be encoded in an equipment tag 130. The equipment reference code 205 and corresponding equipment instance 160 may be identified from the equipment tag 130.

The equipment type 225 may identify a type of equipment instances 160. In one embodiment, the type is a single unique equipment instance 160 such a controller. Alternatively, the type may be a specific model of the equipment instance 160. The equipment type 225 may represent the features and functionality of the equipment instance 160. The equipment type 225 may be used to determine what equipment privileges 230 a given user has for the equipment instance 160. In one embodiment, the equipment privileges 230 for a given equipment type 225 are standardized as a function of user training, experience, and authorizations. For example, a user may be required to complete specified training, have a specified number of hours using a feature and/or function of an equipment instance 160, and/or have appropriate authorizations in order to have a specified equipment privilege 230.

Each equipment privilege 230 may define a coherent group of menus, display data, and functions that are enabled as equipment information 150 at the equipment controls 151 and/or at the electronic device 105. The equipment privileges 230 may be organized so that different sets of menus, data, and functions are enabled for users with different credential data 255. The available menu list 270 may include one or more menus that are enabled at the equipment information 150. The available data set list 275 may include one or more data sets that may be displayed by the equipment information 150. The available functions list 280 may include one or more functions of the equipment information 150 that are enabled at the equipment controls 151. For example, both a first available functions list 280a and a second available functions list 280b may include an emergency shutdown function. However, only the first available functions list 280a may enable a diagnostic test function.

The component map 287 may comprise a visual map locating components of the equipment instance 160. The component map 287 may comprise a plurality of elevations. Each elevation may comprise one or more components.

The identification vector 423 may encode a location of the equipment tag 130 as a vector comprising a plurality of elements. In one embodiment, the vector is a binary vector wherein each element is a binary value. The identification vector 423 may be manipulated with a facility vector in order to determine a location of the electronic device 105. The manipulation of the identification vector 423 with the facility vector greatly accelerates locating the equipment instance 160 within a facility. As a result, the electronic device 105 is rapidly identified and located.

Figure 2D:
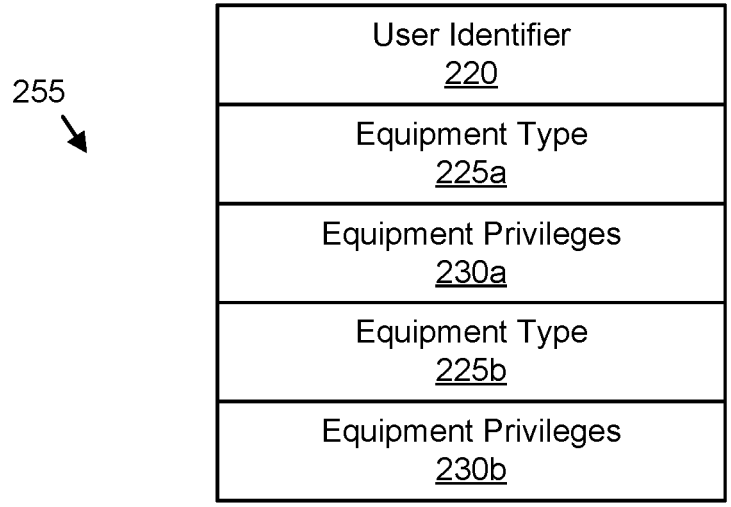
FIG. 2D is a schematic block diagram of credential data according to an embodiment.

FIG. 2D is a schematic block diagram of the credential data 255. The credential data 255 may identify equipment privileges 230 for a user. The credential data 255 may be organized as a data structure in a memory. In the depicted embodiment, the credential data 255 includes a user identifier 220, one or more equipment types 225, and one or more corresponding equipment privileges 230.

The user identifier 220 may uniquely identify the user of the electronic device 105. In one embodiment, the user identifier 220 includes one or more biometric credentials for the user including an image, a fingerprint, a voice print, a retinal scan, and the like. In addition, the user identifier 220 may include an identifying alphanumeric string and/or a password.

Each equipment type 225 may identify a type of equipment instance 160. The equipment privileges 230 corresponding to the equipment type 225 may specify which equipment information 150 and/or equipment controls 151 are enabled for the user.

Figure 2E:
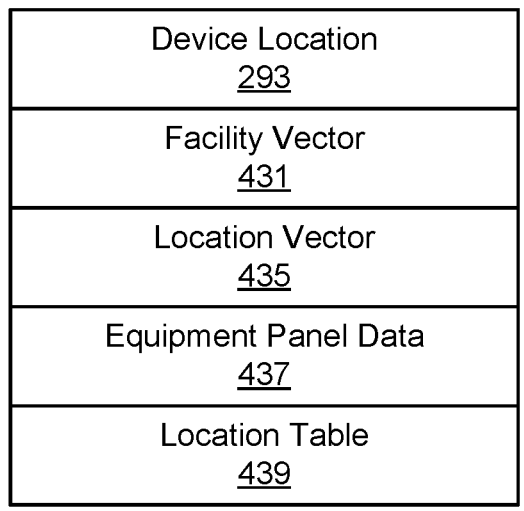
FIG. 2E is a schematic block diagram of system data according to an embodiment.

FIG. 2E is a schematic block diagram of system data. The system data may be organized as a data structure in a memory. In the depicted embodiment, the system data includes a device location 293, the facility vector 431, a location vector 435, equipment panel data 437, and a location table 439.

The device location 293 may locate the electronic device 105. The device location 293 may be determined from the equipment location 291. The device location 425 may be set equal to an equipment location 291. In addition, the device location 293 may be modified from the equipment location 291. For example, the device location 293 may be estimated from a combination of the equipment location 291 and a view of the equipment tag 130 and/or corresponding equipment instance 160. In one embodiment, the device location 293 includes an orientation of the electronic device 105. In addition, the device location 293 may include an orientation of the user.

The facility vector 431 may be a vector that is encoded such that when manipulated along with the identification vector 423, a location of the equipment tag 130 and/or the electronic device 105 may be rapidly determined. In one embodiment, the location vector 435 is calculated as a function of the identification vector 423 and the facility vector 431. The location vector 435 may be a vector description of the device location 293 and/or the equipment location 291. The location vector LV 435 may be calculated using Equation 1, where IV is the identification vector 423 and FV is the facility vector 431.

$$LV = IV \oplus FV \quad \text{Equation 1}$$

The location vector 435 may identify the location of the equipment tag 130 and/or electronic device 105. The location table 439 may include entries for a plurality of locations indexed by location vectors 435. In one embodiment, the location vector 435 is used as an index to the location table 439 to identify the location of the equipment tag 130, equipment instance 160, and/or electronic device 105.

The equipment panel data 437 may record relationships between equipment instances of an equipment panel. For example, the equipment panel data 437 may describe physical and logical locations for each equipment instance 160.

FIG. 2F is a schematic block diagram of the available menu list 270 of FIG. 2C. The available menu list 270 maybe organized as a data structure in a memory. In the depicted embodiment, the available memory list 270 includes a plurality of menu list entries 272. Each menu list entry 272 includes a menu 271, a corresponding equipment privilege 230, and a menu log 273.

Each menu 271a-c may include a plurality of options that may be selected by a user. Some options may be common to two or more menus 271. In addition, some options may be exclusive to one menu 271 Each menu 271a-c may be associated with different equipment privileges 230a-c. For example, a first menu 271a may only be available if the user possesses first equipment privileges 230a. In addition, if the user does not possess first equipment privileges 230a, but does possess second equipment privileges 230b, the second menu 271b may be available for the user.

The menu log 273 may record each instance that a menu 271 was made available to the user. The menu log 273 may include the user identifier 220 for the user and a timestamp. In one embodiment, the memory log 273 records each selection of the menu 271 made by the user.

FIG. 2G is a schematic block diagram of an available data set list 275 of FIG. 2C. The available data set list 275 may be organized as a data structure in a memory. In the depicted embodiment, the available data set list 275 includes a plurality of data set list entries 276. Each data set entry 276 includes a data set 277, a corresponding equipment privilege 230, and a data set log 279.

Each data set 277a-c may include a plurality of data instances. Some data instances may be common to two or more data sets 277. In addition, some data instances may be exclusive to one data set 277. Each data set 277a-c may be associated with different equipment privileges 230a-c. A first data set 277a may be available to a user with first equipment privileges 230a while a second data set 277b may be available to the user with second equipment privileges 230b.

Each data set log 279 may record each data instance of the data set 277 that is accessed by the user. The data set log 279 may include the user identifier 220 for the user and a timestamp.

FIG. 2H is a schematic block diagram of an available functions list 280 of FIG. 2C. The available functions list 280 maybe organized as a data structure in a memory. In the depicted embodiment, the available functions list 280 includes a plurality of function entries 282. Each function entry 282 includes a function 281, a corresponding equipment privilege 230, and a function log 283.

Each function 281 may be a function of the equipment instance 160. In one embodiment, a function is the ability to access an equipment instance 160. In addition, a function may initiate an action by the equipment instance 160. Each function 281a-c may be associated with different equipment privileges 230a-c. A first function 281a may be available to the user with first equipment privileges 230a while a second function 281b may be available to the user with second equipment privileges 230b.

Each function log 283 may record each function 281 that is employed by the user. The function log 283 may include the user identifier 220 for the user and a timestamp.

Figure 3A:
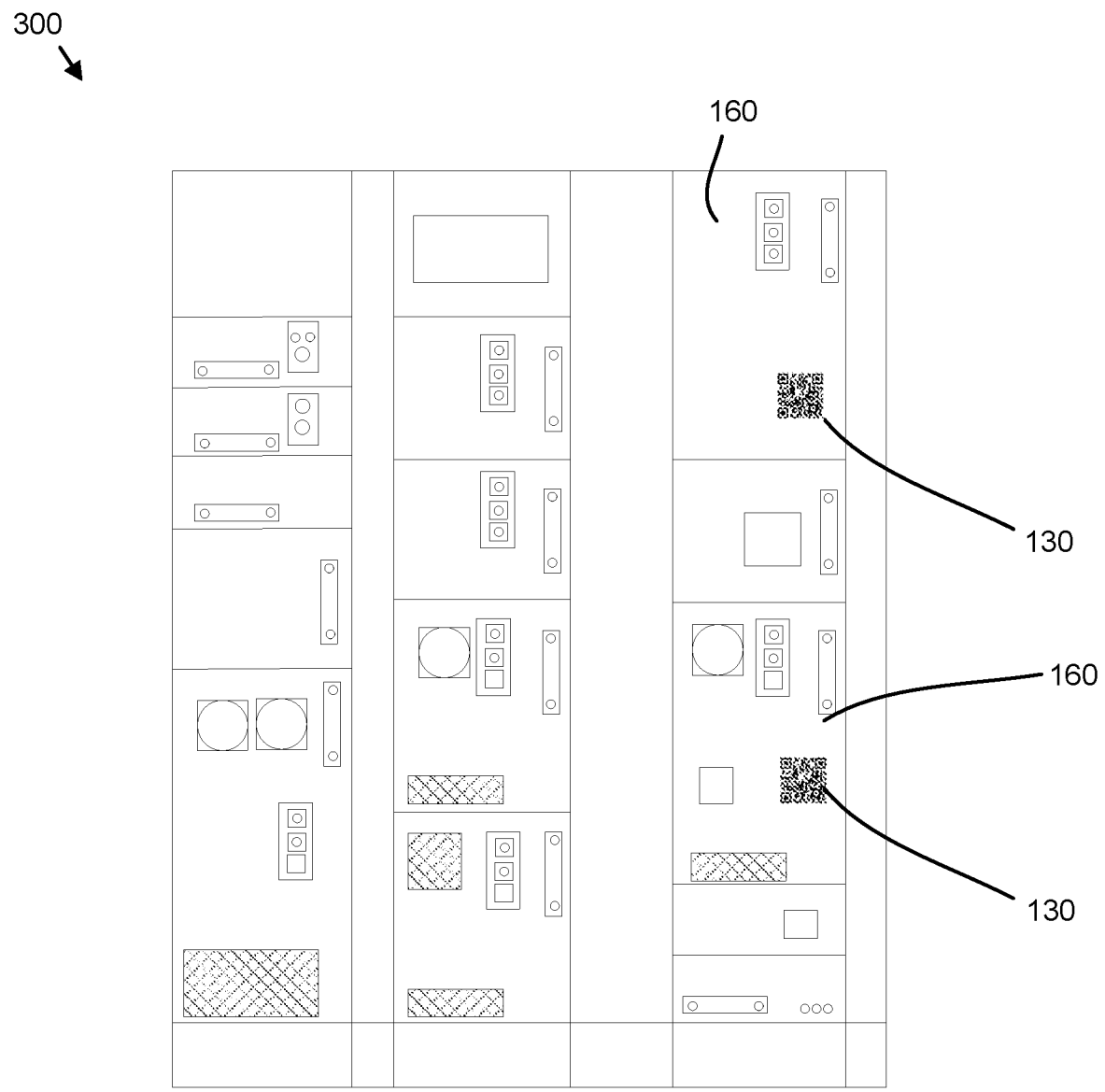
FIG. 3A is a front view drawing of an equipment panel according to an embodiment.

FIG. 3A is a front view drawing of an equipment panel 300. The equipment panel 300 may be disposed in an environment such as an industrial facility. The equipment panel 300 may be an equipment instance 160. In addition, the equipment panel 300 may include a plurality of equipment instances 160.

Equipment tags 130 may be disposed on one or more equipment instances 160. In one embodiment, the camera 135 captures an image 145 of the equipment panel 300. The electronic device 105 may identify a given equipment tag 130 within the image 145.

Figure 3B:
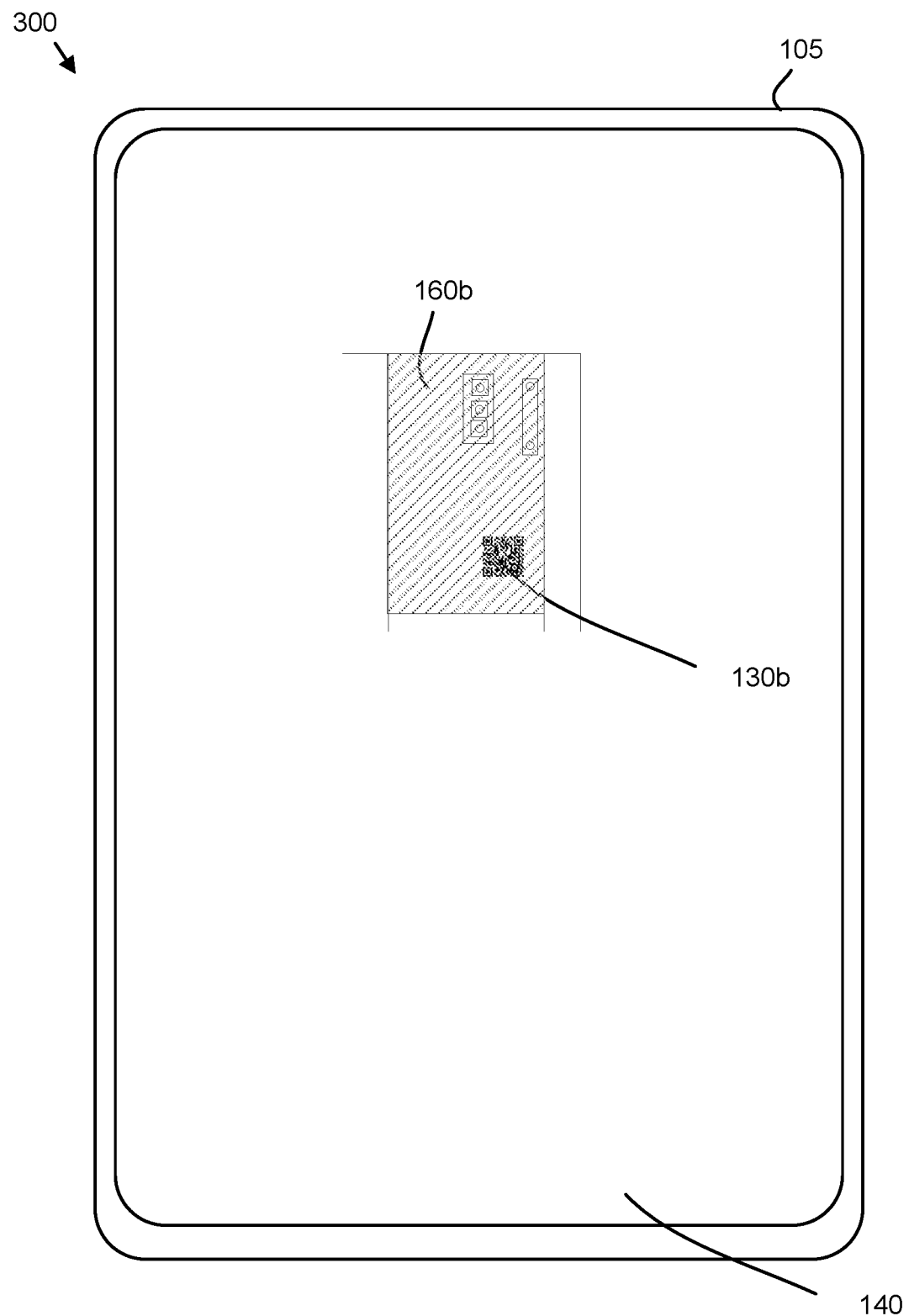
FIG. 3B is a front view drawing of an electronic device presenting an equipment instance according to an embodiment.

FIG. 3B is a front view drawing of an electronic device 105 displaying an equipment panel 300. For simplicity, the display 140 of the tablet computer electronic device 105 is shown. However, the display 140 of the wearable device electronic device 105 and the augmented reality display electronic device 140 may also be employed. The camera 135 may capture an image 145 of one or more equipment instances 160 and corresponding equipment tags 130. The electronic device 105 may identify the equipment tags 130 in the image 145. The electronic device 105 may further identify a given equipment tag 130.

A processor may further emphasize the given equipment instance 160b presented in the display 140. In the depicted embodiment, the given equipment instance 160b is highlighted in the display 140. The highlighting may increase the perceived luminescence of the given equipment instance 160b. Alternatively, the highlighting may decrease the perceived luminescence of the given equipment instance 160b. In one embodiment, the highlighting may modify a color of the given equipment instance 160b.

The given equipment instance 160b may also be one or more of modulated, outlined, and annotated in the display 140. For example, the given equipment instance 160b may be modulated between increased luminescence and decreased luminescence. In addition, the given equipment instance 160 may be modulated between a first color and a second color. The given equipment instance 160 may be outlined with the border of increased luminescence, decreased luminescence, a modified color, a specified color such as red or white, and the like. In one embodiment, the given equipment instance 160b is annotated with a label. In addition, other equipment instances 160 around the given equipment instance 160b may be obscured and/or not displayed as shown in the depicted embodiment.

Figure 3C:
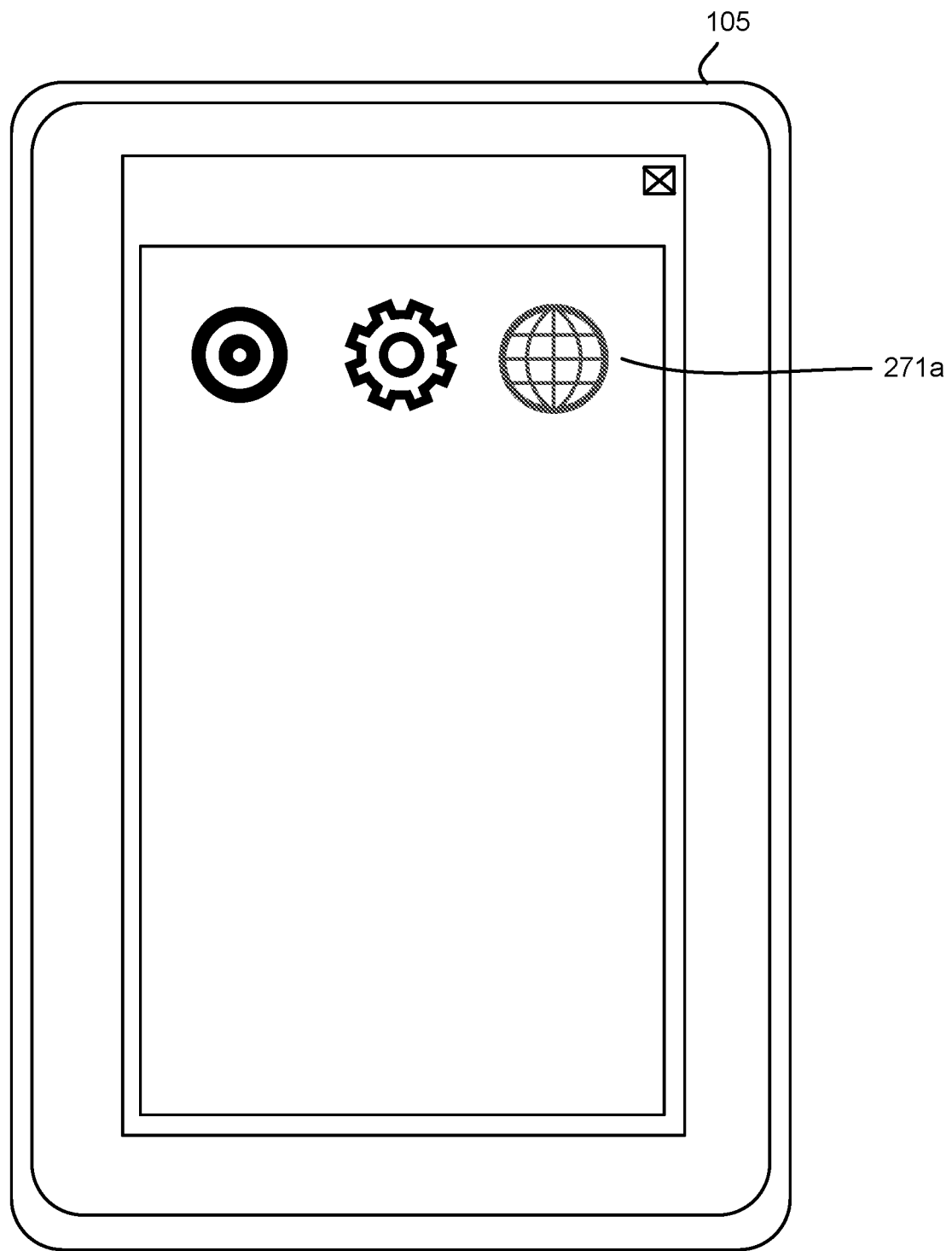
FIG. 3C is a front view drawing of an electronic device presenting a menu according to an embodiment.

FIG. 3C is a front view drawing of an electronic device 105 presenting a first menu 271a. In the depicted embodiment, the first menu 271a includes a first set of three options. The first menu 271a may be associated with first equipment privileges 230a. Thus, if a user has the first equipment privileges 230a, the user may access the first menu 271a and the first menu 271a is an available menu for the user. The first menu 271a may be presented to the user as the equipment information 150 and/or equipment controls 151. The first menu 271a may be presented as the equipment controls 151 of the equipment instance 160.

Figure 3D:
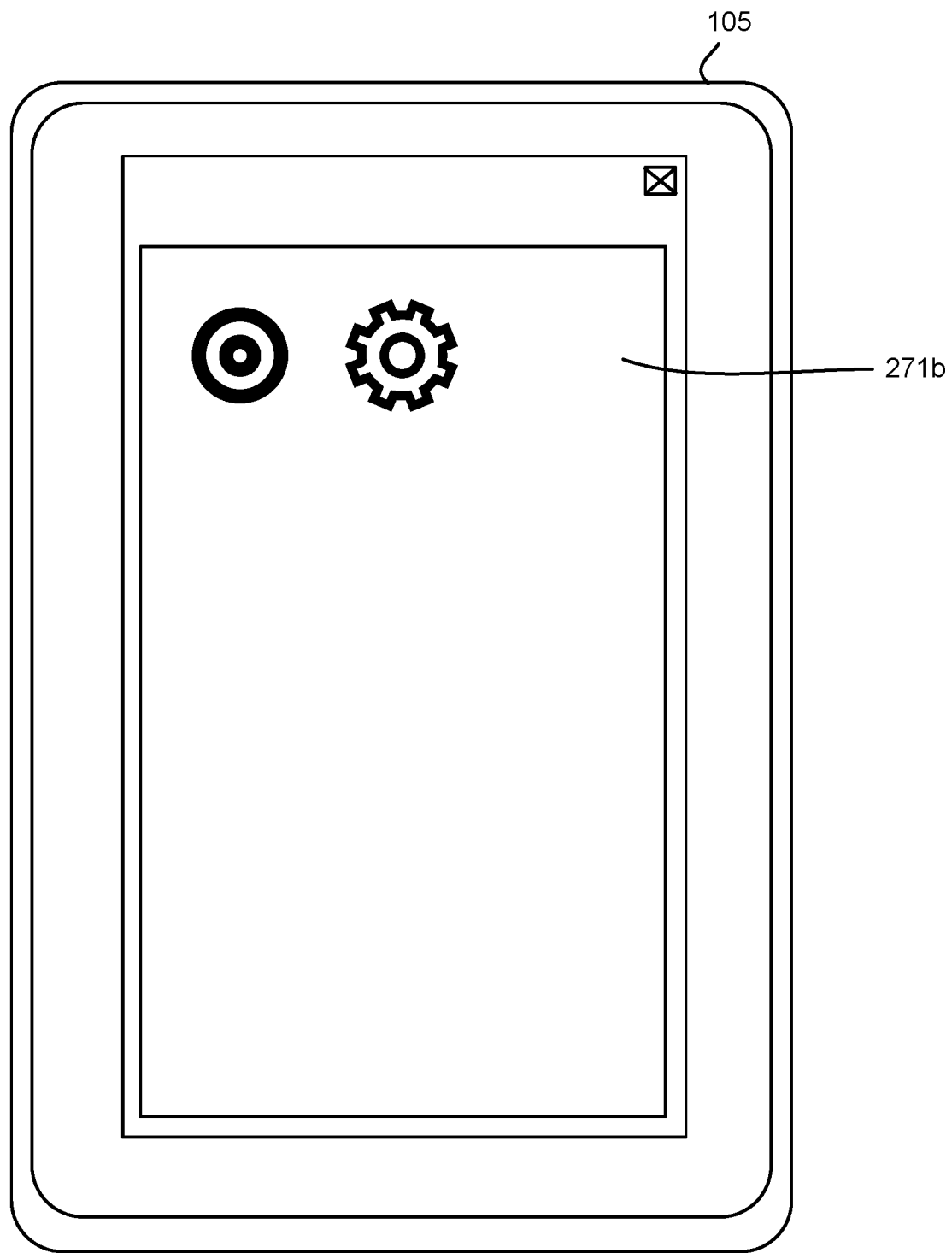
FIG. 3D is a front view drawing of an electronic device presenting a menu according to an alternate embodiment.

FIG. 3D is a front view drawing of an electronic device 105 presenting a second menu 271b. In the depicted embodiment, the second menu 271b includes a second set of two options. The two options are common to the first menu 271a of FIG. 3C. However, the options do not include a third option of the first menu 271a. The second menu 271b may be associated with second equipment privileges 230b. If the user has the second equipment privileges 230b but not the first equipment privileges 230a, the second menu 271b may be presented to the user as the equipment information 150 and/or equipment controls 151 on the equipment instance 160. The second menu 271b may be an available menu for the user.

Figure 3E:
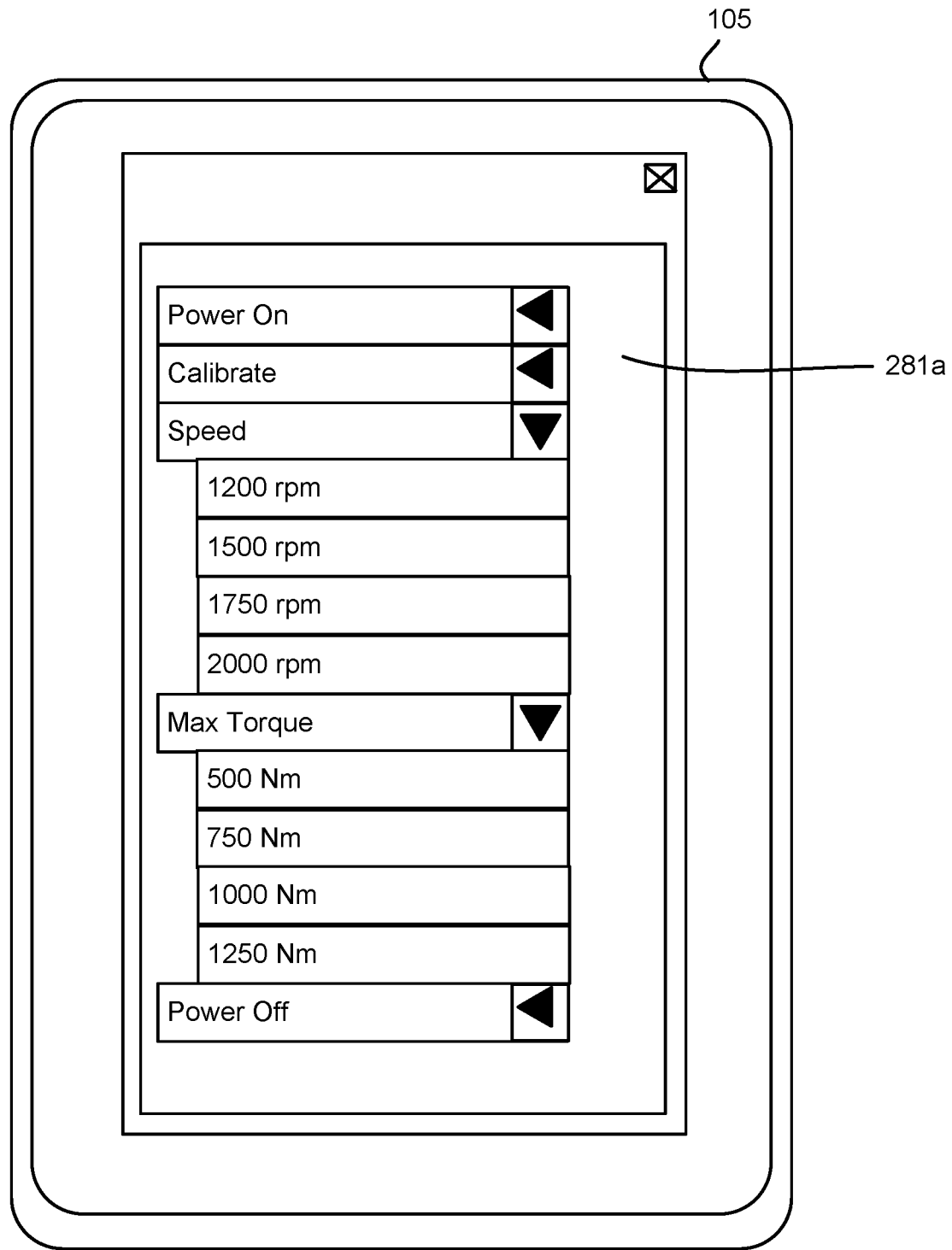
FIG. 3E is a front view drawing of an electronic device presenting available functions according to an embodiment.

FIG. 3E is a front view drawing of an electronic device 105 presenting available functions 281. In the depicted embodiment, the first available functions 281a are presented to the user. In one embodiment, the first available functions 281a are presented as equipment controls 151 on the equipment instance 160. In addition, the first functions 281a may be included as equipment information 150. The first functions 281a may be available to the user if the user has the first equipment privileges 230a.

Figure 3F:
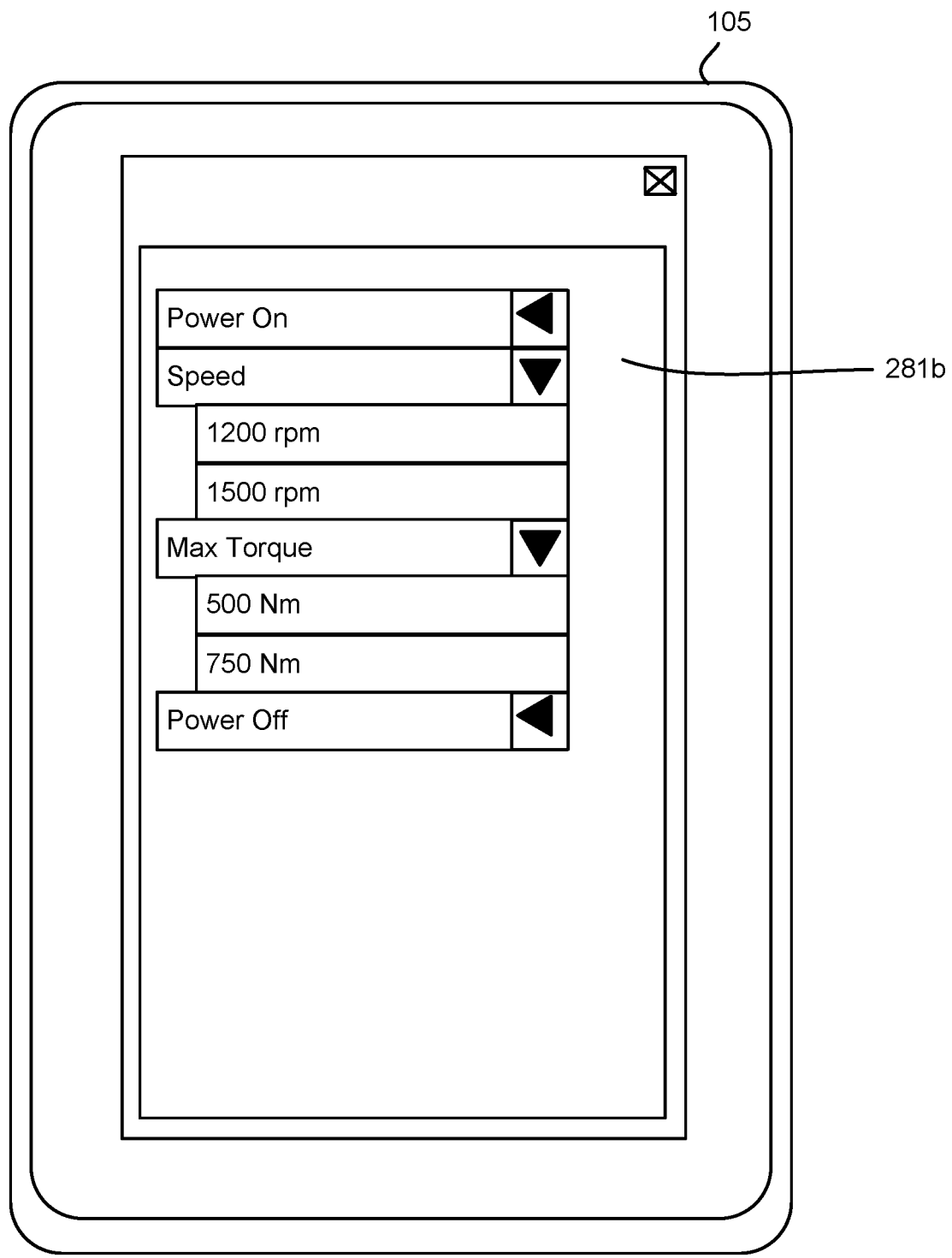
FIG. 3F is a front view drawing of an electronic device presenting available functions according to an alternate embodiment.

FIG. 3F is a front view drawing of an electronic device 105 presenting second available functions 281b. In the depicted embodiment, second available functions 281b are presented to the user. Some of the first available functions 281a of FIG. 3E are not included in the second available functions 281b. The second available functions 281b may be available to the user if the user has the second equipment privileges 230b.

Figure 3G:
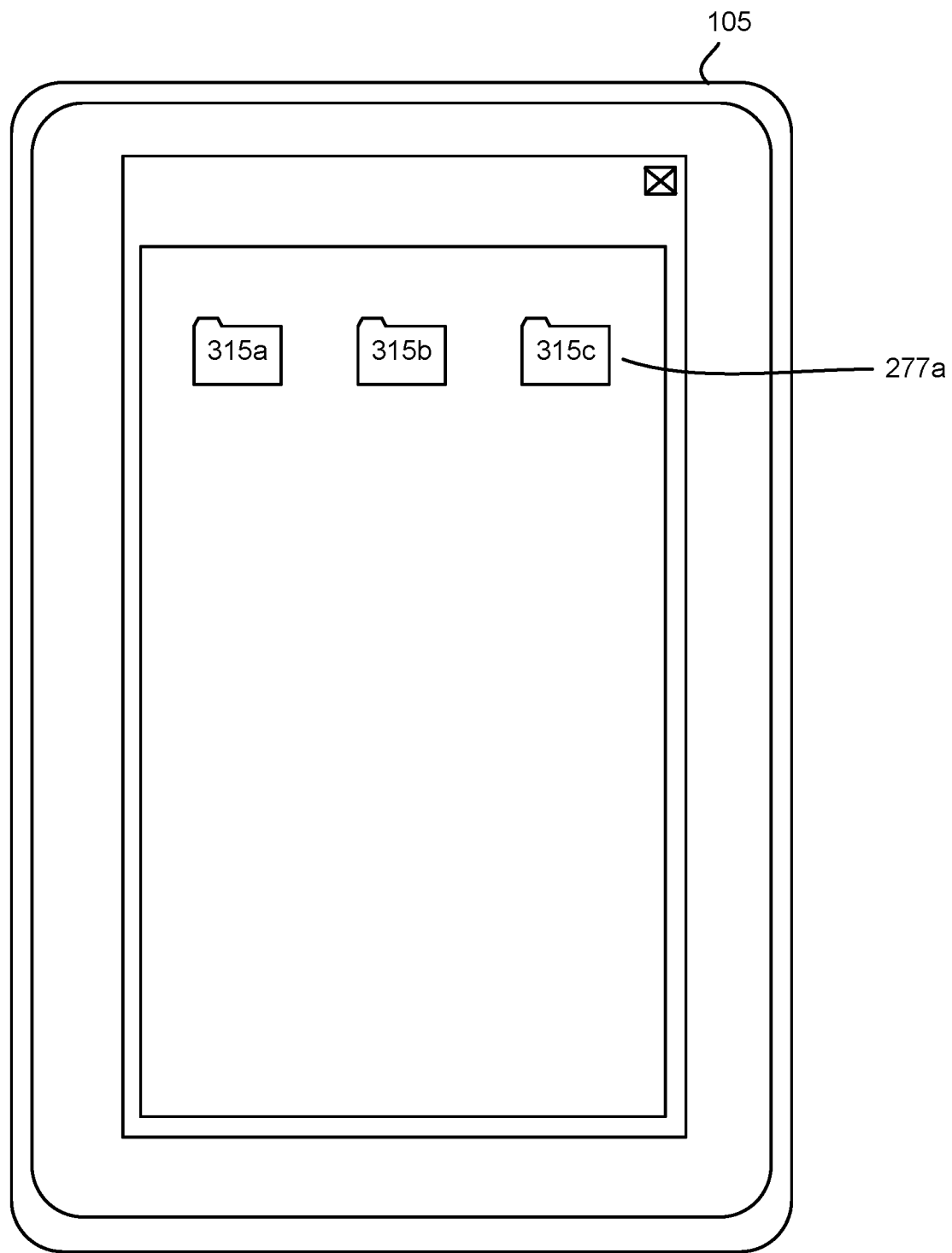
FIG. 3G is a front view drawing of an electronic device presenting available data sets according to an embodiment.

FIG. 3G is a front view drawing of an electronic device 105 presenting available data sets 277. In the depicted embodiment, a first available data set 277a comprising three data set instances 315a-c are presented. The first data set 277a may be presented in response to the user having first equipment privileges 230a corresponding to the first data set 277a. In one embodiment, the user may access each data set instance 315a-c of the first data set 277a. In a certain embodiment, the first data set 277a is presented as equipment controls 151.

Figure 3H:
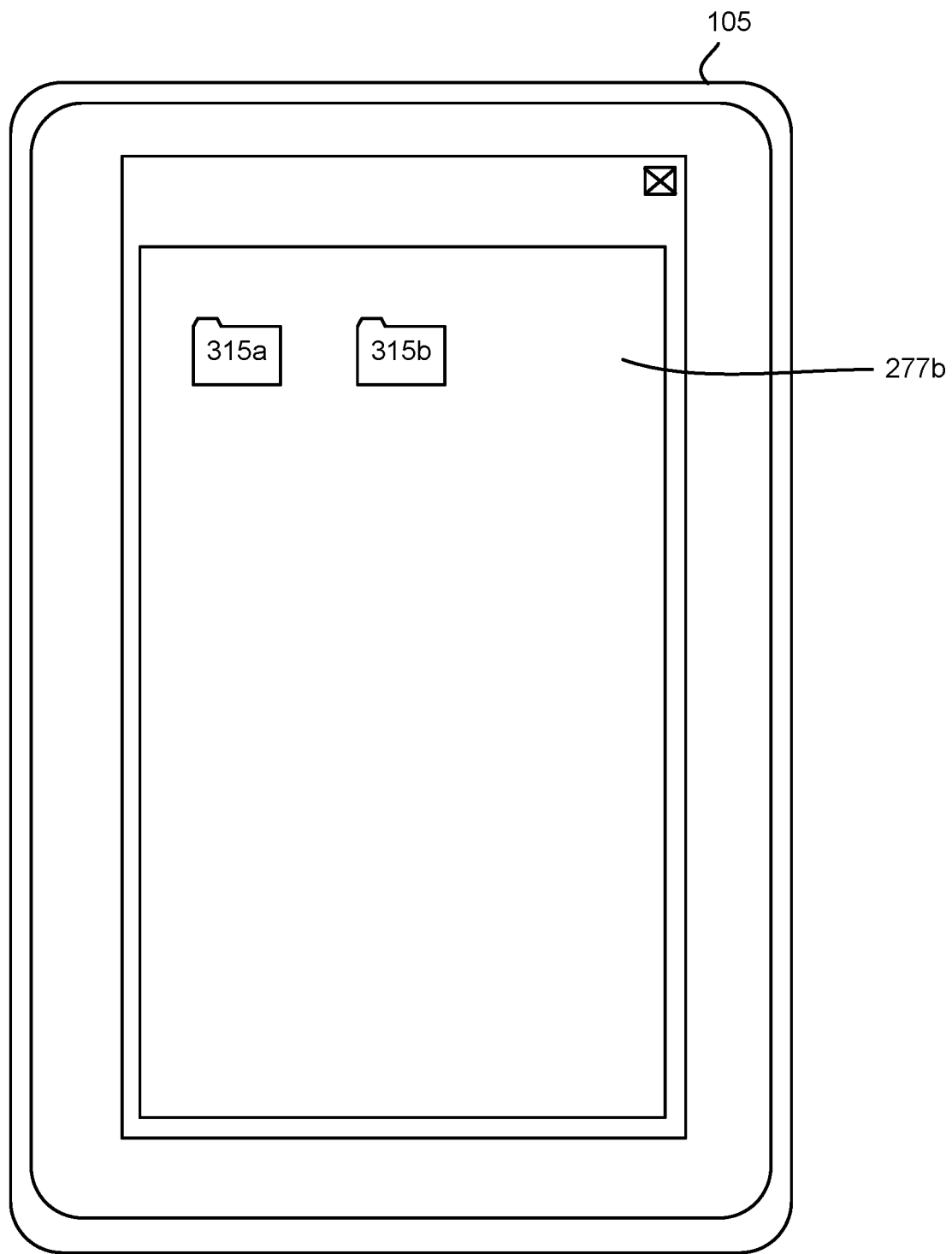
FIG. 3H is a front view drawing of an electronic device presenting available data sets according to an alternate embodiment.

FIG. 3H is a front view drawing of an electronic device 105 presenting a second available data set 277b. In the depicted embodiment, the second available data set 277b is presented to the user in response to the user having second equipment privileges 230b that correspond to the second data set 277b. The second data set 277b does not include the third data set instance 315c of the first data set 277a.

Figure 3I:
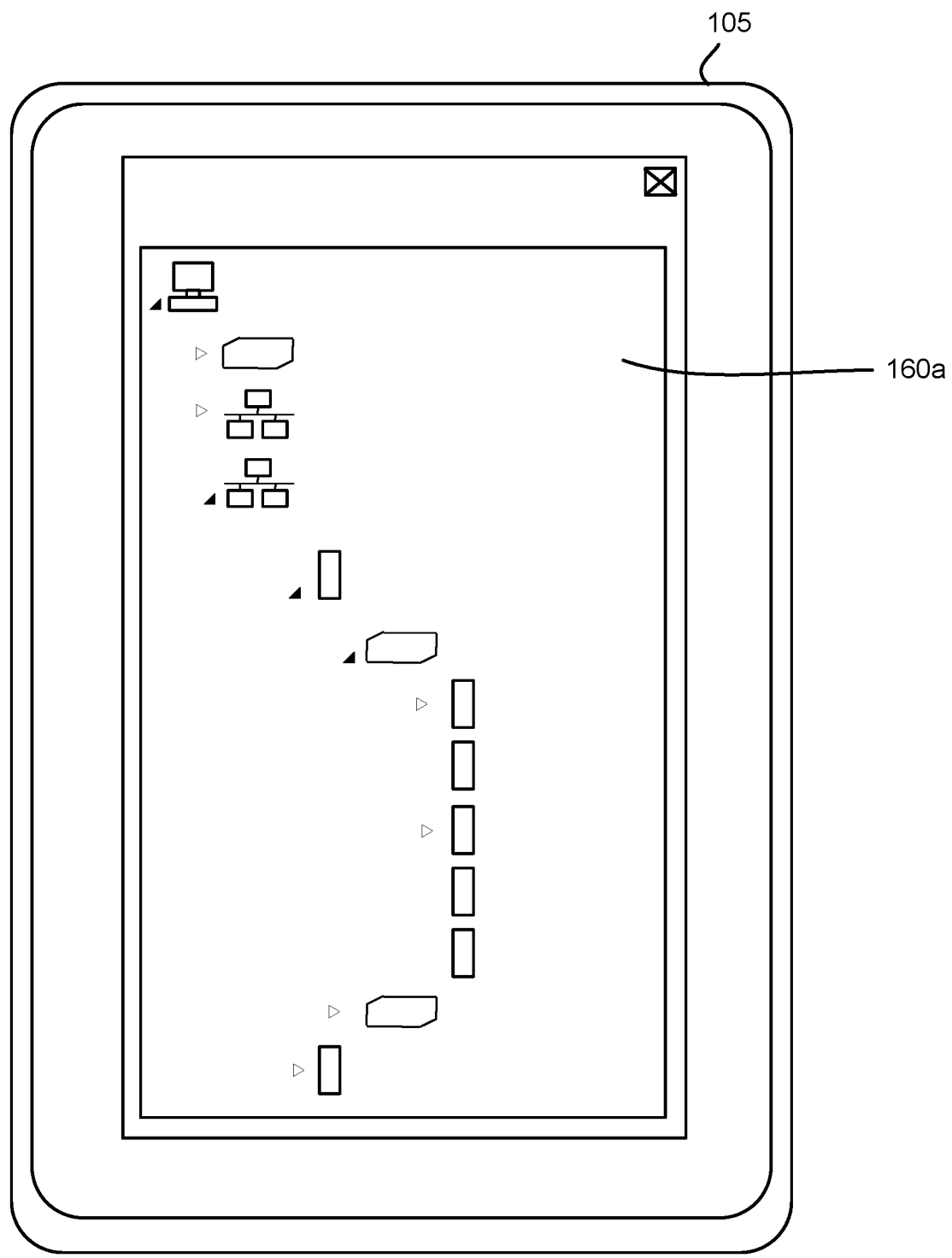
FIG. 3I is a front view drawing of an electronic device presenting accessible equipment instances according to an embodiment.

FIG. 3I is a front view drawing of an electronic device 105 presenting accessible equipment instances 160. In the depicted embodiment, first accessible equipment instances 160a are presented to the user. The first accessible equipment instances 160a may be accessed and/or controlled by the user in response to the user having first equipment privileges 230a. In one embodiment, the first accessible equipment instances 160a are presented as equipment controls 151.

Figure 3J:
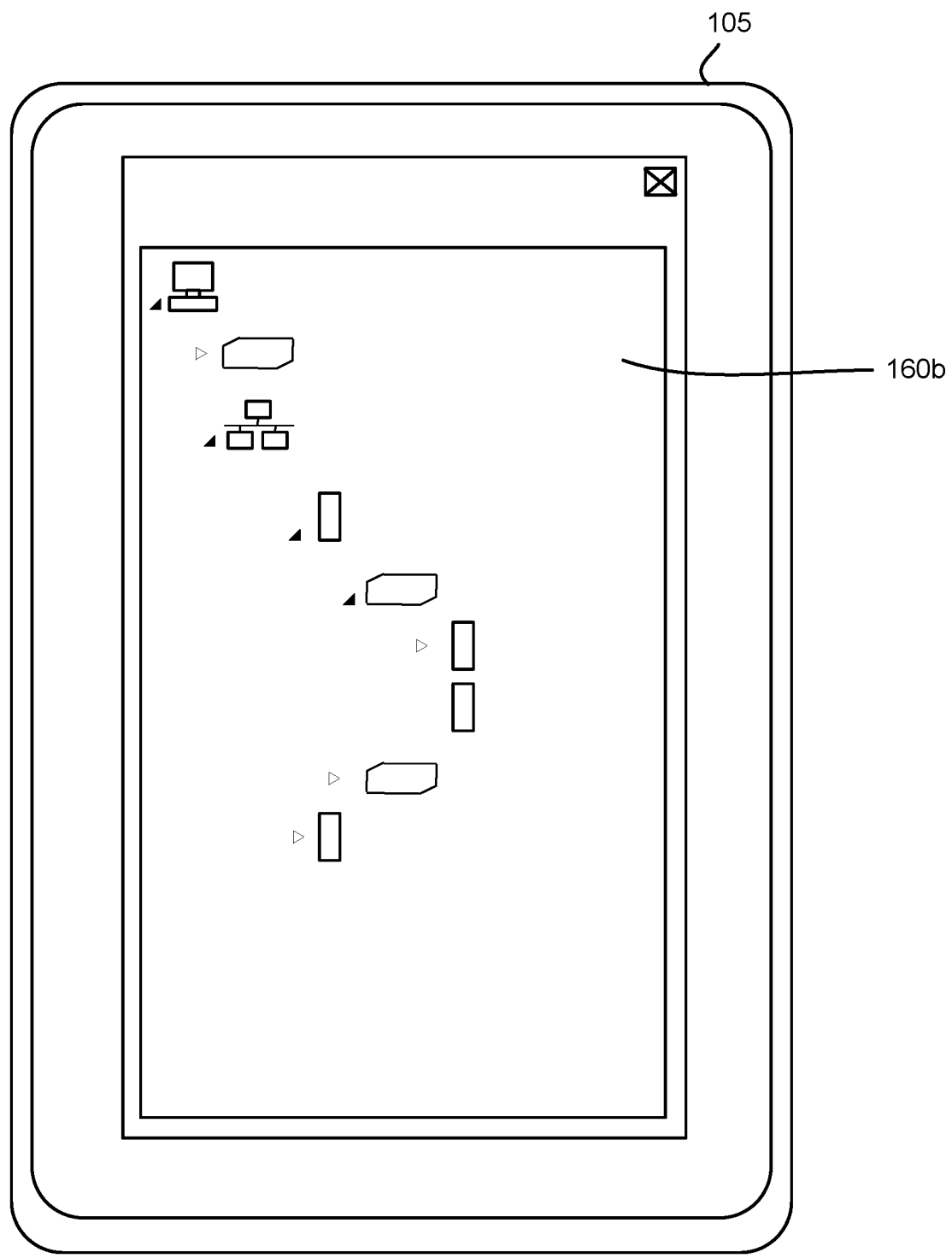
FIG. 3J is a front view drawing of an electronic device presenting accessible equipment instances according to an alternate embodiment.

FIG. 3J is a front view drawing of an electronic device 105 presenting second accessible equipment instances 160b. Some equipment instances 160 that were available as part of the first accessible equipment instances 160a of FIG. 3I are not included in the second accessible equipment instances 160b. The second accessible equipment instances 160b may be accessed and/or controlled by the user in response to the user having second equipment privileges 230b.

Figure 3K:
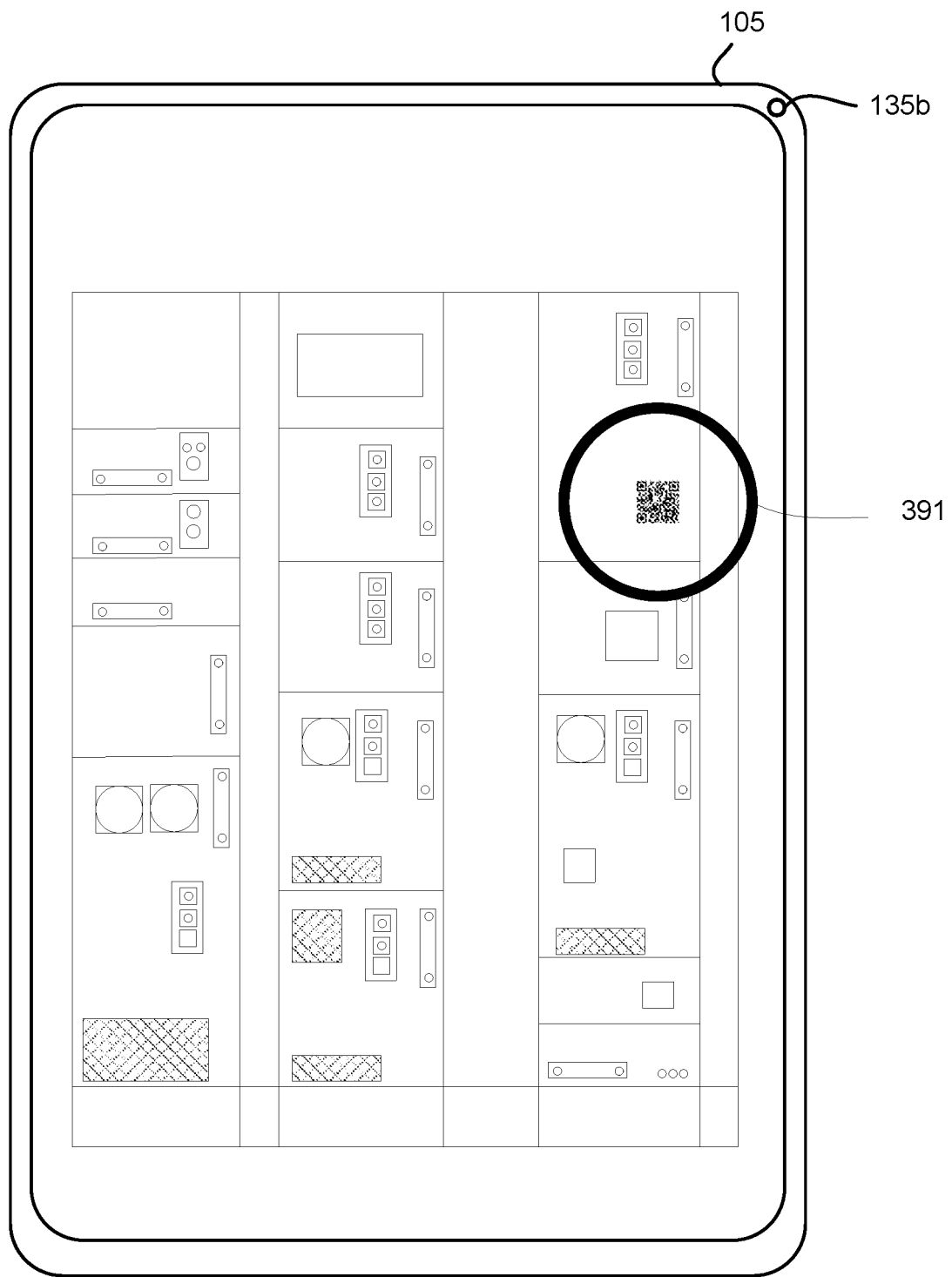
FIG. 3K is a front view drawing of identifying an equipment tag using eye tracking according to an embodiment.

FIG. 3K is a front view drawing of identifying an equipment tag 130 using eye tracking. In the depicted embodiment, the electronic device 105 identifies a user focus 391 using eye tracking. A second camera 135b may track one or more eyes of the user and identify the user focus 391. The equipment tag 130 may be identified as the object of the user focus 391. The user focus 391 may be determined from at least one of eye tracking, a center of field-of-view, and a center of attention.

Figure 3L:
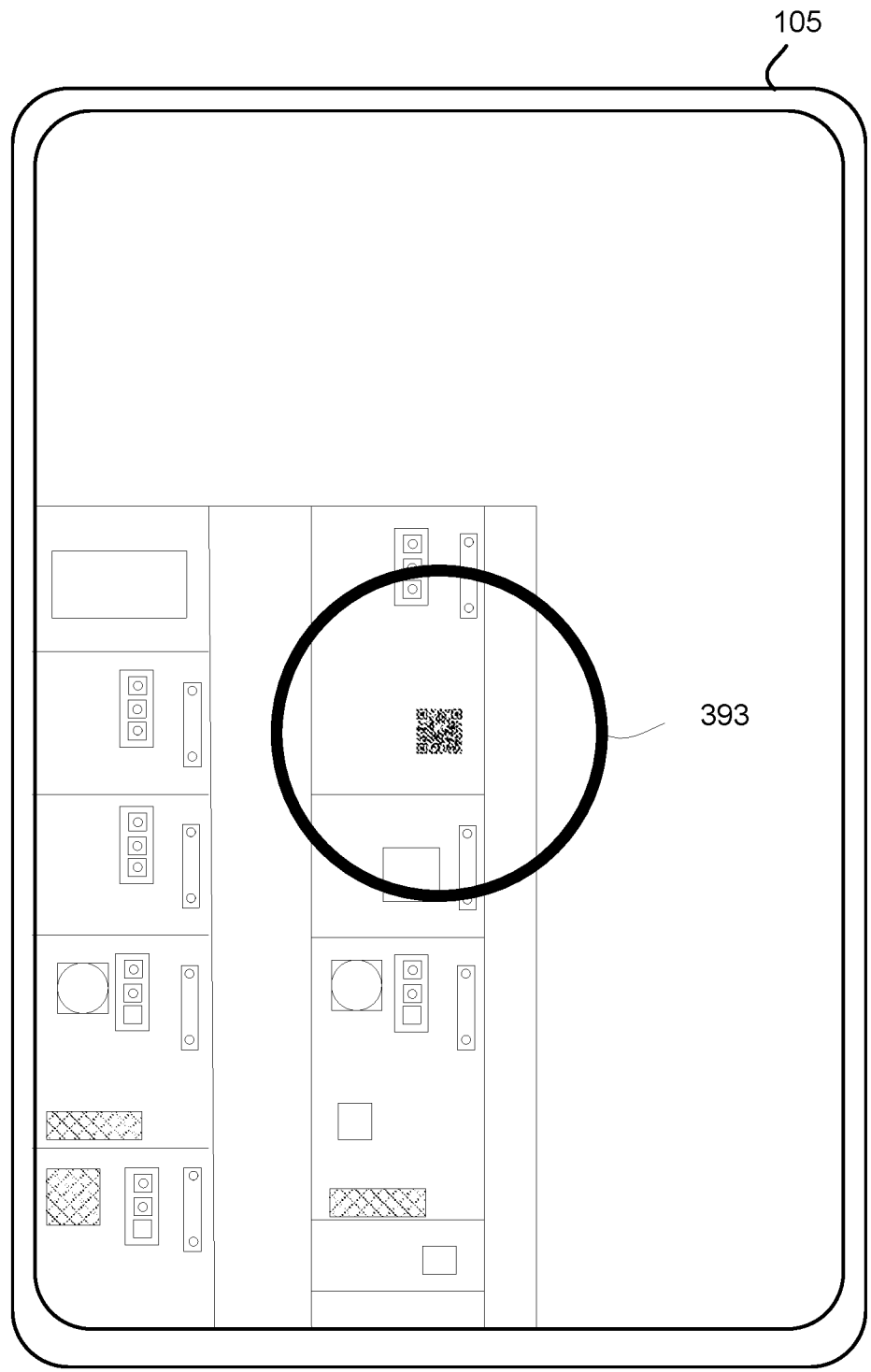
FIG. 3L is a front view drawing of identifying and equipment tag using center a field-of-view according to an embodiment.

FIG. 3L is a front view drawing of identifying and equipment tag using a center a field-of-view 393. In the depicted embodiment, the user focus 391 is determined to be the center of the field-of-view 393 for the electronic device 105. The equipment tag within the center of the field-of-view 393 may be identified as the object of the user focus 391.

In one embodiment, the center of attention is determined to correspond to a mathematical mode of a plurality of locations of the user focus 391. Alternatively, the center of attention may be determined to correspond to a mathematical mode of a plurality of locations of the center of the field-of-view 393. The center of attention may be calculated using Equations 2 and 3, wherein $CA_x$ is the horizontal coordinate within the display 140 of the center of attention, $CA_y$ is the vertical coordinate within the display 140 of the center of attention, n is a number of user focus instances 391, and i is an index to the user focus instances 391.

$$CA_x = \frac{\sum_i^n x}{n} \qquad \text{Equation 2}$$

$$CA_y = \frac{\sum_i^n y}{n} \qquad \text{Equation 3}$$

Figure 3M:
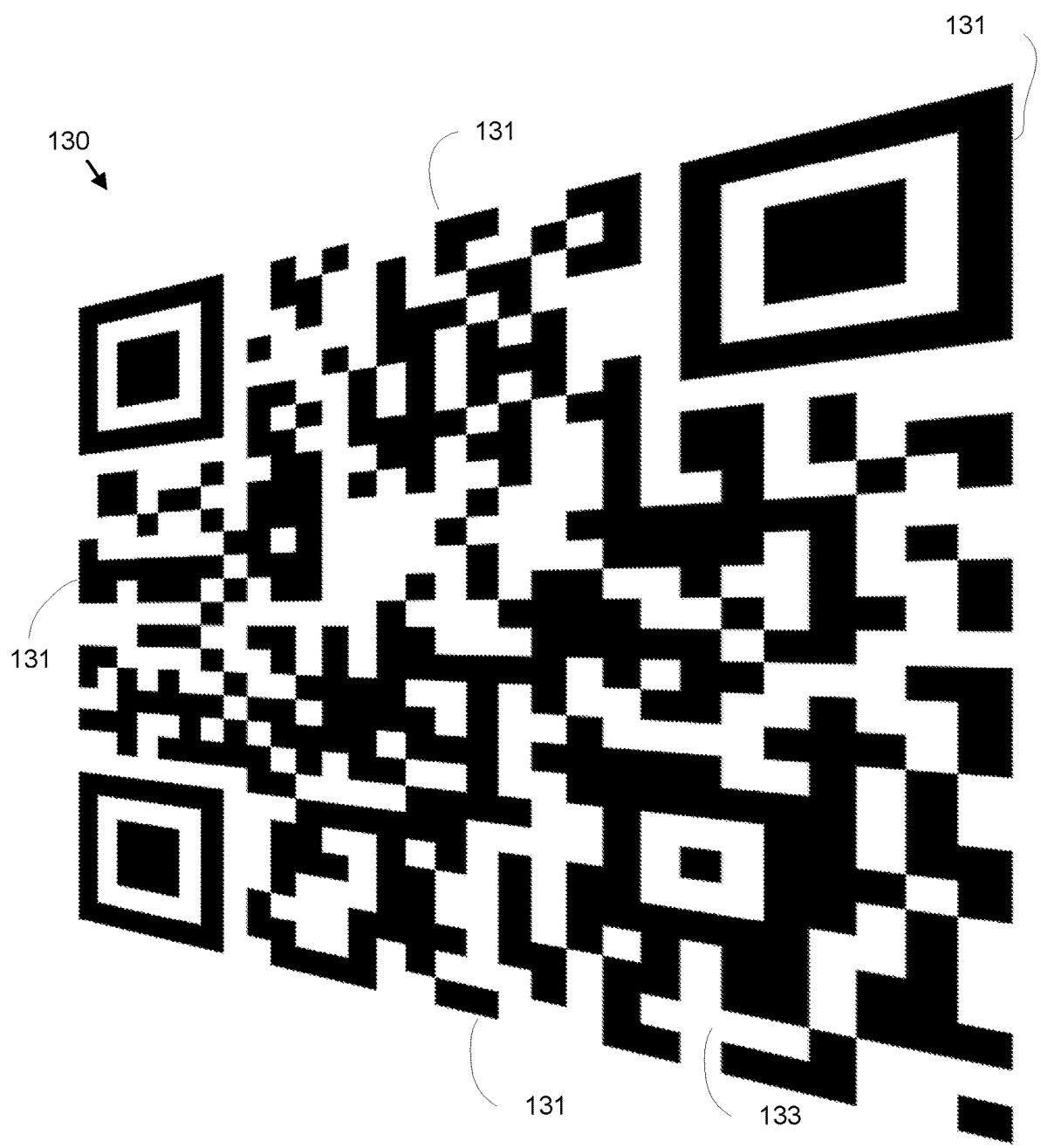
FIG. 3M is a perspective view drawing of an equipment tag according to an embodiment.

FIG. 3M is a perspective view drawing of an equipment tag 130. In the depicted embodiment, the equipment tag 130 is a QR code that is viewed by the camera 135 at an angle and from a distance. The equipment tag 130 has a perceived area 133. In addition, the equipment tag 130 has perceived edges 131, and each perceived edge 131 has a perceived length and a perceived angle relative to the camera 135.

Figure 4:
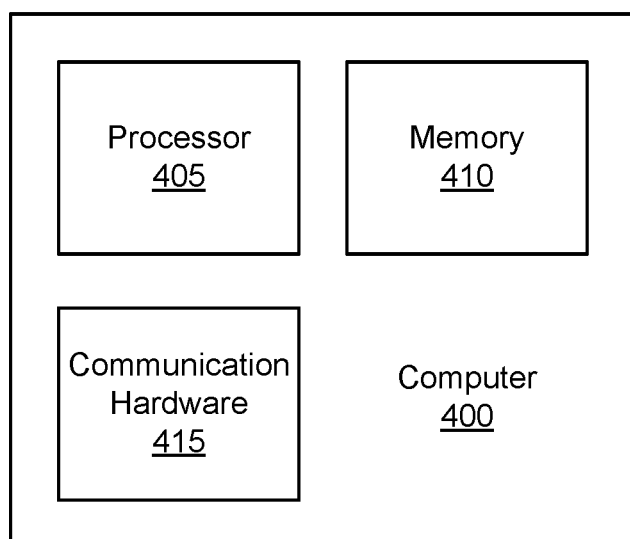
FIG. 4 is a schematic block diagram of the computer according to an embodiment.

FIG. 4 is a schematic block diagram of the computer 400. The computer 400 may be embodied in the electronic device 105. In addition, the computer 400 may be embodied in the server 120. In one embodiment, the computer 400 is embodied in the equipment instance 160. In the depicted embodiment, the computer 400 includes a processor 405, a memory 410, and communication hardware 415. The memory 410 may include a semiconductor storage device, an optical storage device, a hard disk drive, a micromechanical storage device, or combinations thereof. The memory 410 may store code. The processor 405 may execute the code. The communication hardware 415 may communicate with other devices and/or the network 115.

Figure 5A:
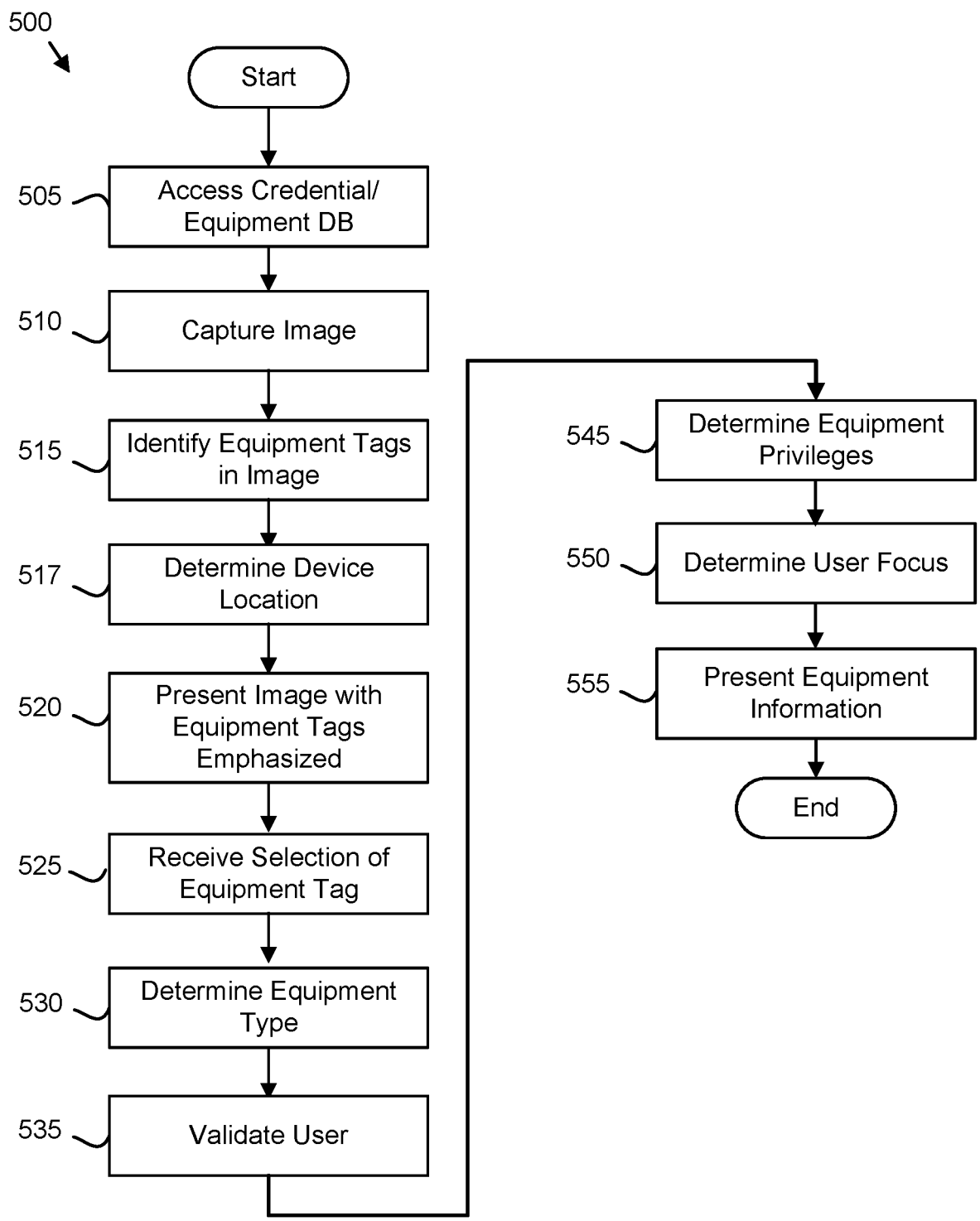
FIG. 5A is a schematic flowchart diagram of a device location method according to an embodiment.

FIG. 5A is a schematic flowchart diagram of a device location method 500. The method 500 may locate an electronic device 105 based on the equipment tag 130. In addition, the method 500 may determine equipment privileges 230 based on the equipment type 225 and the credential data 255 and present equipment information 150 and/or equipment controls 151 enabled by the equipment privileges 230. The method 500 may be performed by the camera 135 and the computer 400 and/or processor 405 of one or more of the electronic device 105, the server 120, and the equipment instance 160.

The method 500 starts, and in one embodiment, the processor 405 accesses 505 the credential database 200 and the equipment database 210. In one embodiment, the processor 405 synchronizes the credential database 200 and/or the equipment database 210 from the server 120 to the electronic device 105. Alternatively, the processor 405 establishes a link to the credential database 200 and/or the equipment database 210 stored on the server 120.

The camera 135 may capture 510 the image 145 of the equipment instance 160. In one embodiment, the camera 135 continuously captures 510 images 145 as a video stream. Alternatively, the camera 135 may capture 510 the image 145 in response to a user command. In one embodiment, the camera 135 may capture 510 the image 145 in response to a user focus 391 on an equipment tag 130 and/or on an equipment instance 160.

The processor 405 may further identify 515 one or more equipment tags 130 within the image 145. In one embodiment, the processor 405 parses the equipment reference code 205 from each equipment tag 130 to identify the equipment tags 130 and/or the corresponding equipment instances 160.

The processor 405 may determine 517 the device location 293 based on the one or more equipment tags 130 within the image 145. In a certain embodiment, the device location 293 is determined 517 based on a given equipment tag 130 within the image 145. The device location 293 may be based on the equipment location 291. In a certain embodiment, the device location 293 is set equal to the equipment location 291 for a first equipment tag 130. The device location 293 may be further modified by triangulating between two or more equipment tags 130 to determine the location of the electronic device 105 relative to the first equipment tag 130.

In one embodiment, the processor 405 determines an orientation of the electronic device 105 relative to the equipment tag 130 as a function of the perceived edges 131 of the equipment tag 130. In addition, the processor 405 may determine a distance to the equipment tag 130 based on the perceived size 133 of the equipment tag 130. The processor 405 may determine the device location DL 293 as shown in Equation 4, wherein MO is an orientation matrix of the electronic device 105, EL is the equipment location 291, and D is a distance from the electronic device 105 to the equipment tag 130.

$$DL=DMO+EL \quad \text{Equation 4}$$

In one embodiment, the device location 293 is determined using the identification vector 423 to accelerate determining the device location 293.

In one embodiment, the processor 405 presents 520 the image 145 with the one or more equipment tags 130 and/or corresponding equipment instances 160 emphasized in the display 140. Emphasized equipment tags 130 and/or equipment instances 160 may be highlighted, modulated, outlined, and/or annotated.

The processor 405 may receive 525 a selection of an equipment tag 130. A user may make a selection of the given equipment tag 130 from the user focus 391 along with a corresponding command. Alternatively, the given equipment tag 130 may be selected from the center of the field-of-view 393 along with a corresponding command. In one embodiment, a given equipment tag 130 at the center of attention maybe emphasized and the user may select the emphasized given equipment tag 130 using a corresponding command. In addition, the user may select a given equipment tag 130 and/or corresponding equipment instance 160 by touching the given equipment tag 130 and/or corresponding equipment instance 160 on the display 140. In one embodiment, if only one equipment tag 130 is presented 520, that equipment tag 130 may be automatically selected.

The processor 405 may determine 530 the given equipment type 225 from the equipment tag 130. The equipment type 225 may be determined 530 for the selected equipment tag 130. In one embodiment, the equipment reference code 205 is parsed from the equipment tag 130. In addition, the equipment reference code 205 may be parsed from a hash of the equipment tag 130. The equipment reference code 205 may be used as an index to identify the corresponding equipment data 215 and equipment type 225 from the equipment database 210.

The processor 405 may validate 535 the user with the credential data 255. In one embodiment, the processor 405 identifies the user with the alphanumeric string and/or password of the user identifier 220. In addition, the processor 405 may validate 535 the user with the biometric credentials of the user identifier 220. In alternative embodiment, the processor 405 may identify the user with the biometric credentials and validate the user using the password and/or alphanumeric string of the user identifier 220.

The processor 405 may determine 545 the equipment privileges 230 for the user based on the equipment type 225 n the credential data 255 for the user as a function of the equipment type 225 and the credential data 255. For example, if the equipment instance 160 is of a first equipment type 225a, the equipment privileges 230 for the user may be the corresponding first equipment privileges 230a recorded in the credential data 255. The determination 545 of the equipment privileges 230 is described in more detail in FIG. 5B.

The processor 405 may determine 550 the user focus 391 for the user. In addition, the processor 405 may present 555 the equipment information 150 and/or equipment controls 151 that are enabled by the equipment privileges 230 and the method 500 ends. In a certain embodiment, the equipment information 150 and/or equipment controls 151 are only presented when the given equipment instance 160 corresponding to the given equipment tag 130 is within a field-of-view of the electronic device 105. The field-of-view may be the display 140. Alternatively, the field-of-view may be a central portion of the display 140. The equipment information 150 and/or equipment controls 151 may be presented by the electronic device 105. In addition, the equipment information 150 and/or equipment controls 151 may be presented by the equipment instance 160.

In one embodiment, presenting 555 the equipment information 150 comprises presenting one or more available menus 271 from the available menus list 270. In addition, presenting 550 the equipment information 150 may comprise presenting one or more available data sets 277 from the available data sets list 275. In a certain embodiment, presenting 550 the equipment information 150 may comprise enabling one or more functions 281 from the available functions list 280. The menus 271, data sets 277, and functions 281 may be presented via the equipment controls 151.

In one embodiment, the equipment information 150 and/or equipment controls 151 are presented 555 based on the user focus 391. The equipment information 150 and/or equipment controls 151 may be presented 550 at the user focus 391. Alternatively, the equipment information 150 and/or equipment controls 151 may be presented 555 as offset from the user focus 391. In a certain embodiment, the equipment information 150 and/or equipment controls 151 may be presented 555 so as not to obscure the given equipment instance 160.

In one embodiment, the equipment information 150 and/or equipment controls 151 may be presented 555 in proximity to a relevant element of the equipment instance 160. For example, an error message equipment information 150 may be presented in proximity to a component of the equipment instance 160 that is generating the error message.

Figure 5B:
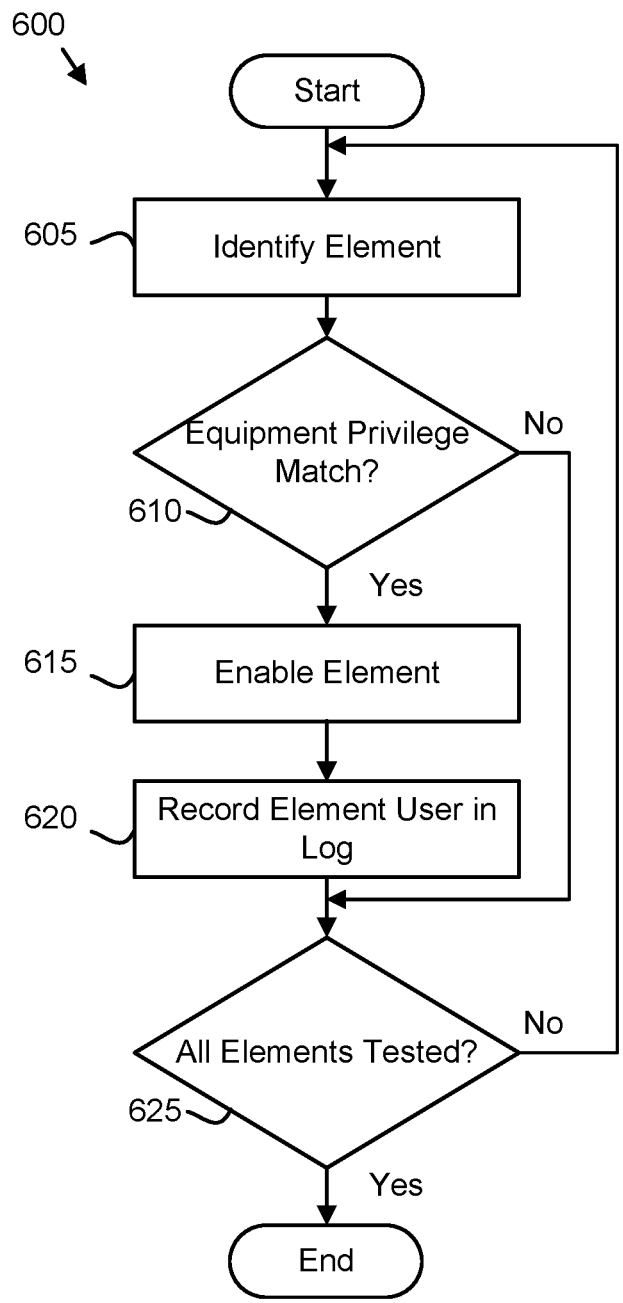
FIG. 5B is a schematic flowchart diagram of a privilege determination method according to an embodiment.

FIG. 5B is a schematic flowchart diagram of a privilege determination method 600. The method 600 may determine equipment privileges 230 for an equipment instance 160. The method 600 may perform step 545 of FIG. 5A. The method 600 may be performed by the camera 135 and the computer 400 and/or processor 405 of one or more of the electronic device 105, the server 120, and the equipment instance 160.

The method 600 starts, and in one embodiment, the processor 405 identifies 605 an element associated with an equipment instance 160. The element may be one of a menu 271, a data set 277, and a function 281. The processor 405 further determine 610 if the equipment privilege 230 associated with the element in the equipment data 215 is included in and/or matches the equipment privileges 230 associated with the equipment type 225 for the equipment instance 160 in the credential data 255. If the equipment privilege 230 associated with the element in the equipment data 215 does not match the equipment privileges 230 associated with the equipment type 225 for the equipment instance 160 in the credential data 255, the processor 405 determine 625 if all elements have been tested.

If the equipment privilege 230 associated with the element in the equipment data 215 matches the equipment privileges 230 associated with the equipment type 225 for the equipment instance 160 in the credential data 255, the processor 405 enables 615 the element in the equipment information 150 and/or equipment controls 151. As a result, the user may be able to employ the enabled element.

In one embodiment, the processor 450 records 620 that the user is enabled to employ the enabled element in the corresponding log for the element. For example, the menu 271, user identifier 220, and a timestamp may be recorded in the corresponding menu log 273 in response to enabling the menu 271.

The processor 405 determine 625 if all elements of the equipment instance 160 have been tested. If all elements have not been tested, the processor 405 loops to identify 605 another element. If all elements have been tested, the method 600 ends.

Problem/Solution

A user and/or her colleagues may be unsure of her location within an industrial facility. The embodiments may locate the user within the industrial facility by determining a device location 293 for electronic device 105 based on identifying a given equipment tag 130 within an image 145 captured by the electronic device 105. As a result, the user and/or her colleagues can immediately determine her location.

The equipment instance 160 may be physically accessible to many users, including unauthorized and/or untrained users. Because it is undesirable and dangerous for unauthorized users to employ the equipment instance 160, it is vital that only authorized and trained users with the proper credentials are able to fully utilize the equipment information 150 and/or equipment controls 151. In addition, some equipment information 150 should not be made available to unauthorized users. The embodiments described herein restrict access to the equipment information 150 and/or equipment controls 151 by employing the equipment tag 130 to determine the equipment privileges 230 for a user. As a result, only the proper equipment information 150 and/or equipment controls 151 are enabled and presented for the user, so that untrained and/or unauthorized users do not misuse the equipment information 150 and/or equipment controls 151.

This description uses examples to disclose the invention and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An electronic device comprising:
    an augmented reality display that presents an image;
    a processor;
    a memory that stores code executable by the processor to perform:
    identifying a given equipment tag within the image at a user focus determined at a center of field-of-view visibly outlined by the augmented reality display; and
    determining a device location based on the given equipment tag.

2. The electronic device of claim 1, wherein the user focus is determined from at least one of eye tracking, the center of field-of-view, and a center of attention.

3. The electronic device of claim 1, the processor further presenting equipment information based on the user focus.

4. The electronic device of claim 1, wherein the device location is determined from an equipment location for an equipment instance corresponding to the given equipment tag.

5. The electronic device of claim 4, the processor further determining an orientation of a user relative to the equipment tag.

6. The electronic device of claim 1, the processor further:
   determining a given equipment type from the given equipment tag;
   determining equipment privileges as a function of the given equipment type and credential data; and
   presenting equipment information comprising an available menu that are enabled by the equipment privileges.

7. The electronic device of claim 6, wherein presenting the equipment information further comprises presenting one or more of available data sets and available functions.

8. The electronic device of claim 6, wherein the equipment information is only presented when the given equipment corresponding to the given equipment tag is in a field-of-view of the electronic device.

9. The electronic device of claim 6, wherein the equipment privileges comprises an available menu list, an available data set list, and an available functions list.

10. The electronic device of claim 6, wherein the processor further validates a user with credential data.

11. The electronic device of claim 1, wherein the processor further performs:
    presenting the image with the given equipment tags emphasized; and
    receiving a selection of the given equipment tag from the image.

12. The electronic device of claim 1, wherein the equipment tag is selected from the group consisting of a two-dimensional optical code, a Quick Response (QR) code, a bar code, a Universal Product Code (UPC), a BLUETOOTH® Low Energy (BLE) Tag, a Radio Frequency Identifier (RFID), a Near Field Communication (NFC) tag, and a Europay, Mastercard, Visa (EMV) tag.

13. A method comprising:
    identifying, by use of a processor, a given equipment tag within the image at a user focus determined at a center of field-of-view visibly outlined by the augmented reality display; and
    determining a device location based on the given equipment tag.

14. The method of claim 13, wherein the user focus is determined from at least one of eye tracking, the center of field-of-view, and a center of attention.

15. The method of claim 13, the method further presenting equipment information based on the user focus.

16. The method of claim 13, wherein the device location is determined from an equipment location for an equipment instance corresponding to the given equipment tag.

17. A computer program product comprising a computer readable storage medium having program code embodied therein, the program code readable/executable by a processor to:
    identify a given equipment tag within the image at a user focus determined at a center of field-of-view visibly outlined by the augmented reality display; and
    determine a device location based on the given equipment tag.

18. The computer program product of claim 17, wherein the user focus is determined from at least one of eye tracking, the center of field-of-view, and a center of attention.

19. The computer program product of claim 17, wherein the processor further presents equipment information based on the user focus.

20. The computer program product of claim 17, wherein the device location is determined from an equipment location for an equipment instance corresponding to the given equipment tag.

* * * * *